(12) United States Patent
Dennis et al.

(10) Patent No.: US 6,850,677 B2
(45) Date of Patent: Feb. 1, 2005

(54) METHOD AND SYSTEM FOR DISPERSION MAPS AND ENHANCED DISTRIBUTED GAIN EFFECT IN LONG HAUL TELECOMMUNICATIONS USING DISTRIBUTED AND REMOTELY PUMPED ERBIUM-BASED AMPLIFICATION

(75) Inventors: Michael L. Dennis, Ellicott City, MD (US); M. Imran Hayee, Woodstock, MD (US); Cathal Mahon, Early Redding (GB); Bo Pedersen, Annapolis, MD (US); Nadakumar Ramanujam, Ellicott City, MD (US); William Shieh, Clarksville, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 10/618,071

(22) Filed: Jul. 14, 2003

(65) Prior Publication Data

US 2004/0109655 A1 Jun. 10, 2004

Related U.S. Application Data

(63) Continuation-in-part of application No. 09/809,422, filed on Mar. 16, 2001, now Pat. No. 6,633,712.

(51) Int. Cl.[7] .................................................. G02B 6/02
(52) U.S. Cl. ...................................... 385/123; 385/147
(58) Field of Search ................................. 385/123–129, 385/140, 147; 398/101

(56) References Cited

U.S. PATENT DOCUMENTS

| | | |
|---|---|---|
| 5,778,128 A | 7/1998 | Wildeman |
| 5,912,755 A | 6/1999 | Bergano |
| 5,946,119 A | 8/1999 | Bergano et al. |
| 5,969,806 A | 10/1999 | Bergano |
| 6,052,219 A | 4/2000 | Kidorf et al. |
| 6,057,950 A | 5/2000 | Bergano |
| 6,081,366 A | 6/2000 | Kidorf et al. |
| 6,088,152 A | 7/2000 | Berger et al. |
| 6,134,033 A | 10/2000 | Bergano et al. |

(List continued on next page.)

OTHER PUBLICATIONS

Golovchenko, et al., "Modeling of Transoceanic Fiber–Optic WDM Communication Systems", IEEE J. Of Selected Topics in Quantum Electronics, Mar./Apr. 2000.
Gautheron, "Terabit submarine links wrap the world in fiber", Subsea Networks, pp. 29–32, Mar. 2001.
Lewis, et al., "Low–Noise High Gain Dispersion Compensating Broadband Raman Amplifier", OFC paper TuA2–1, pp. 5–7.

(List continued on next page.)

Primary Examiner—Akm Enayet Ullah

(57) ABSTRACT

A system and method of providing a transmission span for a telecommunications link based on a remote $Er^{3+}$-doped fiber amplification scheme is provided, where a transmission span comprises first through third segments each respectively comprising first-third optical fibers having first-third fiber lengths and first-third physical properties. The first and third segments are optically coupled to opposing ends of the second segment. At least one of the first and third physical properties is different from the second physical property, where the first segment provides low nonlinearity, the third segment provides distributed gain, and the second segment compensates for the dispersion of the first and third segments. The span also includes a fourth optical fiber that is doped with a non-zero concentration of $Er^{3+}$, and is disposed at a location in the span for remote pumping to provide discrete amplification of the optical signal. The location can be within the first segment, within the second segment, within the third segment, at an interface between the first and second segments, and/or at an interface between the second and the third segments.

23 Claims, 18 Drawing Sheets

U.S. PATENT DOCUMENTS

| | | | |
|---|---|---|---|
| 6,137,604 | A | 10/2000 | Bergano |
| 6,141,468 | A | 10/2000 | Kidorf et al. |
| 6,157,754 | A | 12/2000 | Sasaoka et al. |
| 6,163,636 | A | 12/2000 | Stentz et al. |
| 6,188,823 | B1 | 2/2001 | Ma |
| 6,292,288 | B1 | 9/2001 | Akasaka et al. |
| 6,310,709 | B1 | 10/2001 | Bergano |
| 6,311,002 | B1 | 10/2001 | Evangelides et al. |
| 6,317,238 | B1 | 11/2001 | Bergano et al. |
| 6,320,884 | B1 | 11/2001 | Kerfoot, III et al. |
| 6,411,408 | B1 | 6/2002 | Dennis et al. |
| 6,633,712 | B2 * | 10/2003 | Dennis et al. ............... 385/123 |
| 2003/0031440 | A1 * | 2/2003 | Dennis et al. ............... 385/123 |
| 2003/0174988 | A1 * | 9/2003 | Bickham et al. ............. 385/127 |
| 2003/0231886 | A1 * | 12/2003 | Young et al. ................ 398/101 |
| 2004/0067034 | A1 * | 4/2004 | Rosenblum et al. ........ 385/127 |

OTHER PUBLICATIONS

Knudsen, et al., "Optimisation of dispersion compensating fibres for cabled long–haul applications", Electronics Letters, vol. 36, Dec. 7, 2000.

Bergano, "Undersea Amplified Lightwave Systems Design", Optical Fiber Telecommunications vol. III A, Chapter 10, 1997.

Forghieri, et al., "Fiber Nonlinearities and Their Impact on Transmission Systems", Optical Fiber Telecommunications vol. III A, Chapter 8, 1997.

Ando, et al., "Timing Jitter Characteristics of RZ Pulse Nonlinear Transmission on Dispersion Managed Fiber Link", IEICE Trans. Fundamental, vol. E82–A., No. 10, Oct. 1999.

AT&T Technical Journal, Jan./Feb. 1995, vol. 74, No. 1.

* cited by examiner (1520nm)            (1620nm)

(SHORT-WAVELENGTH CHANNEL)

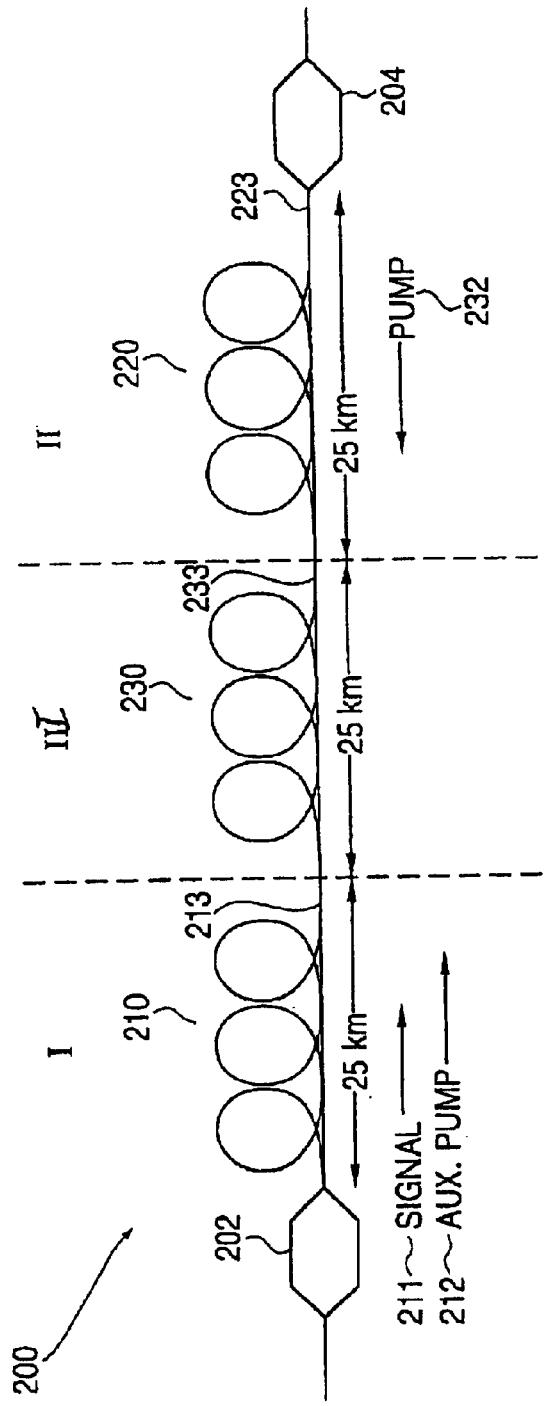
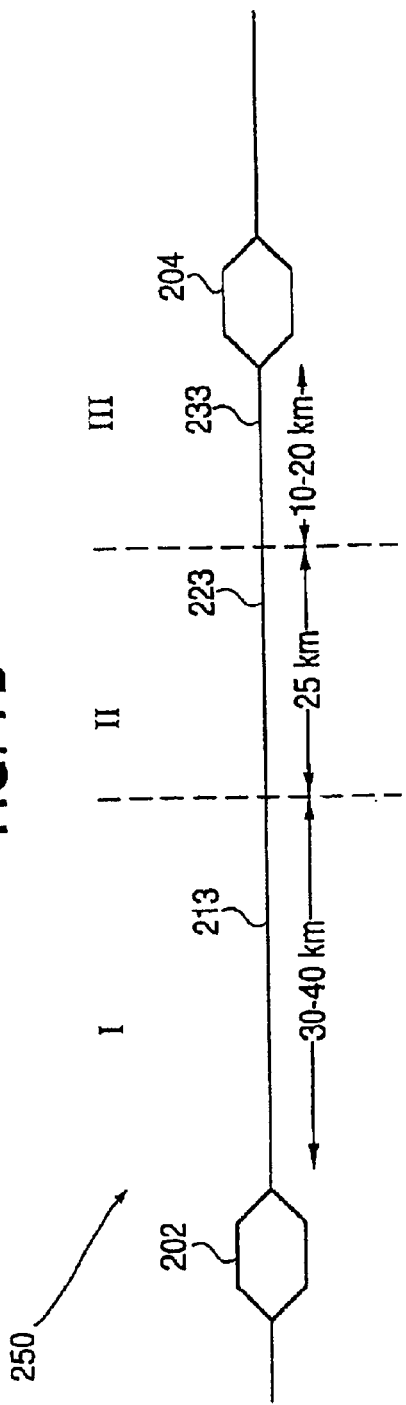

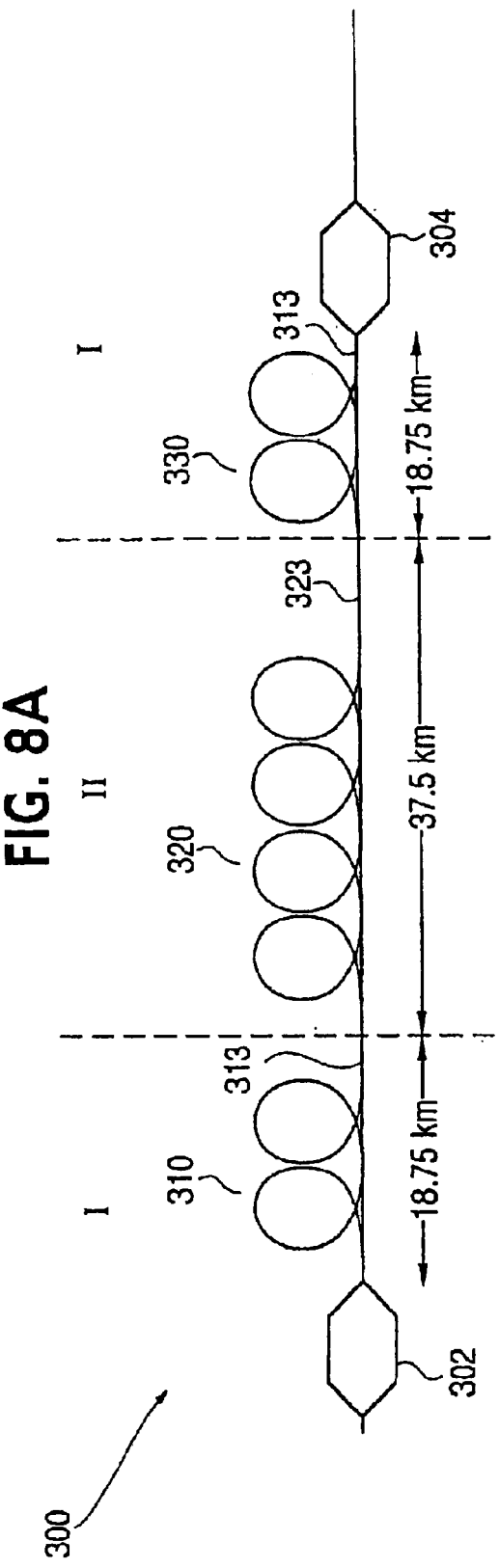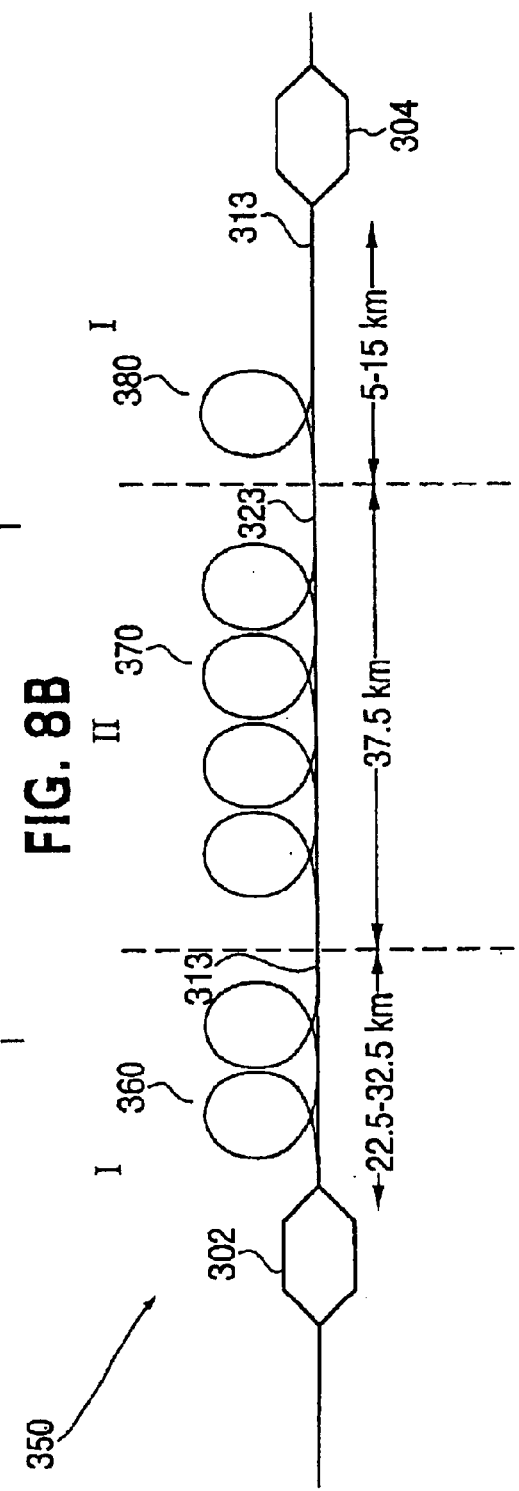

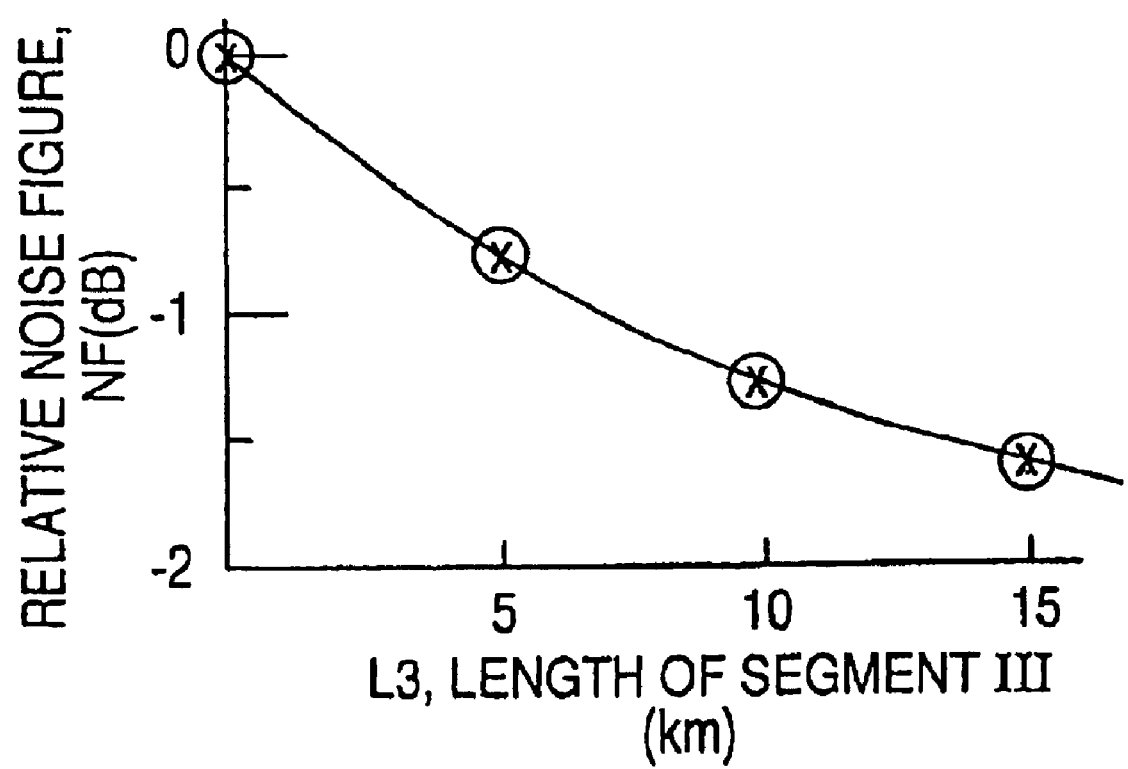

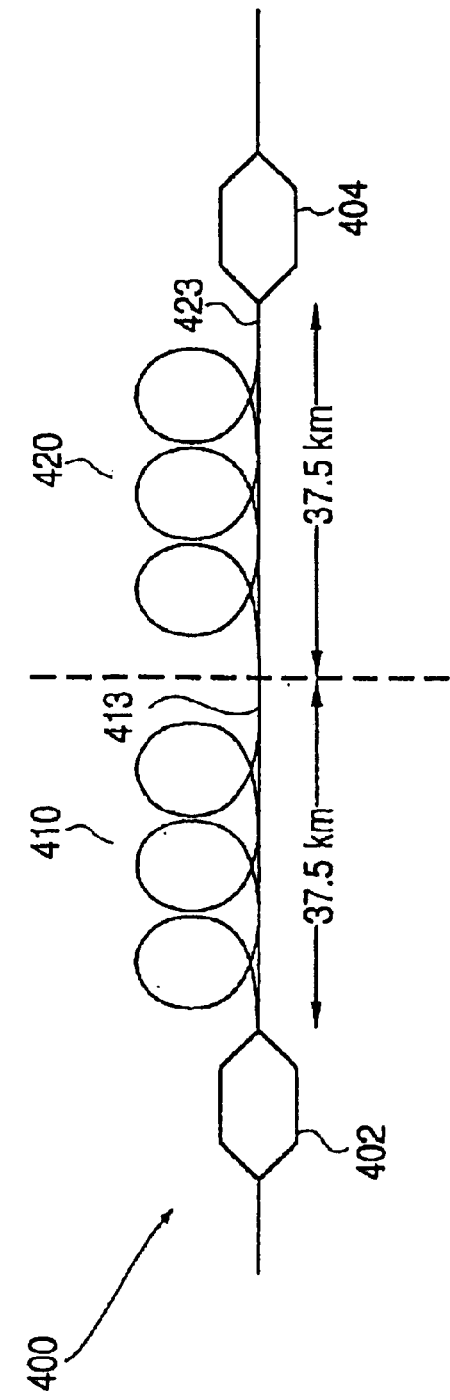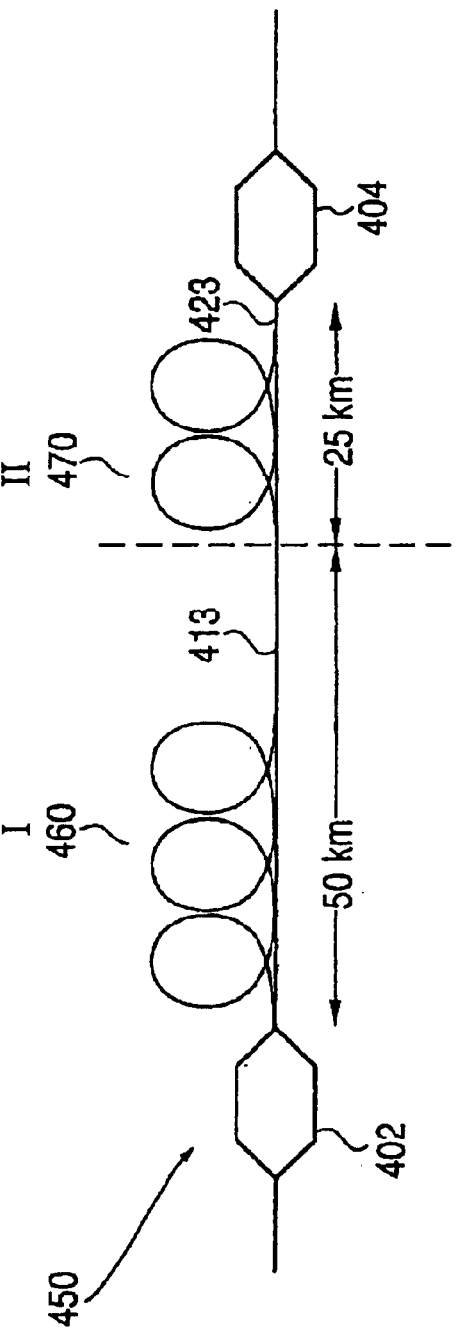

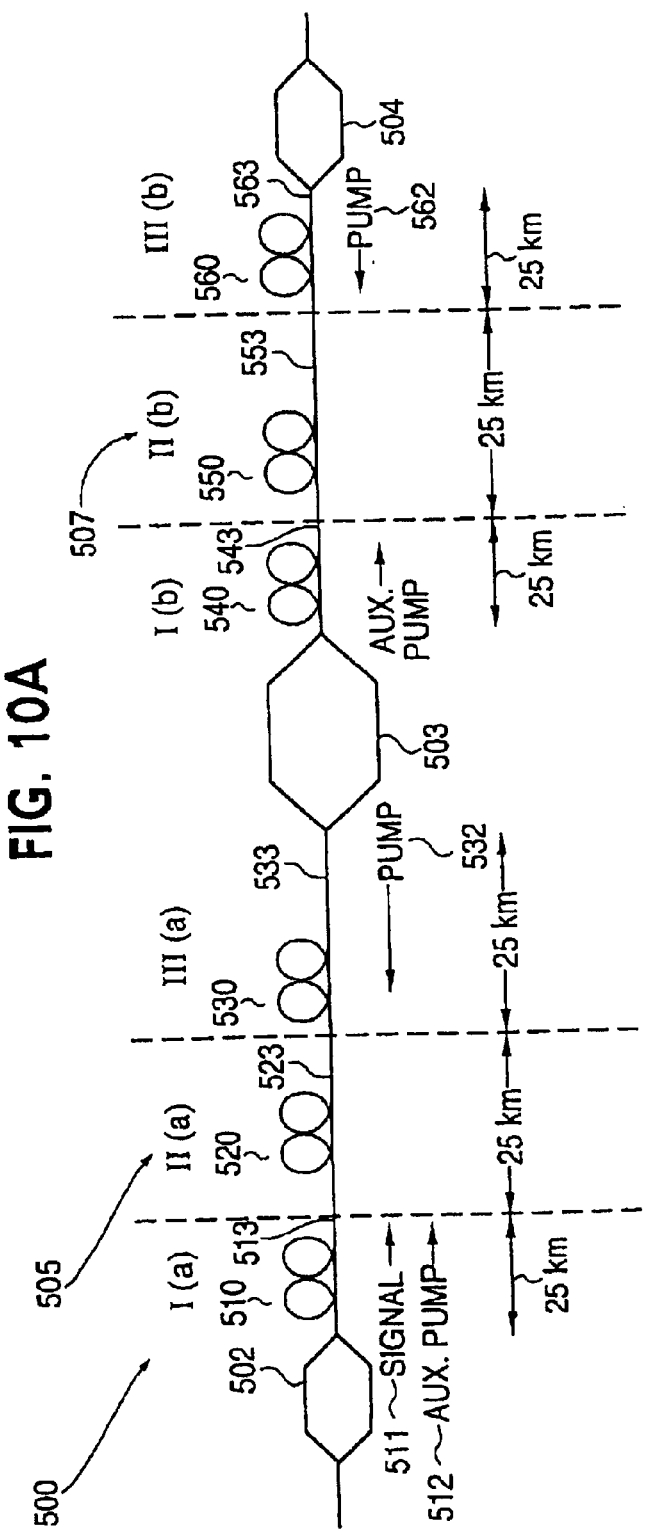
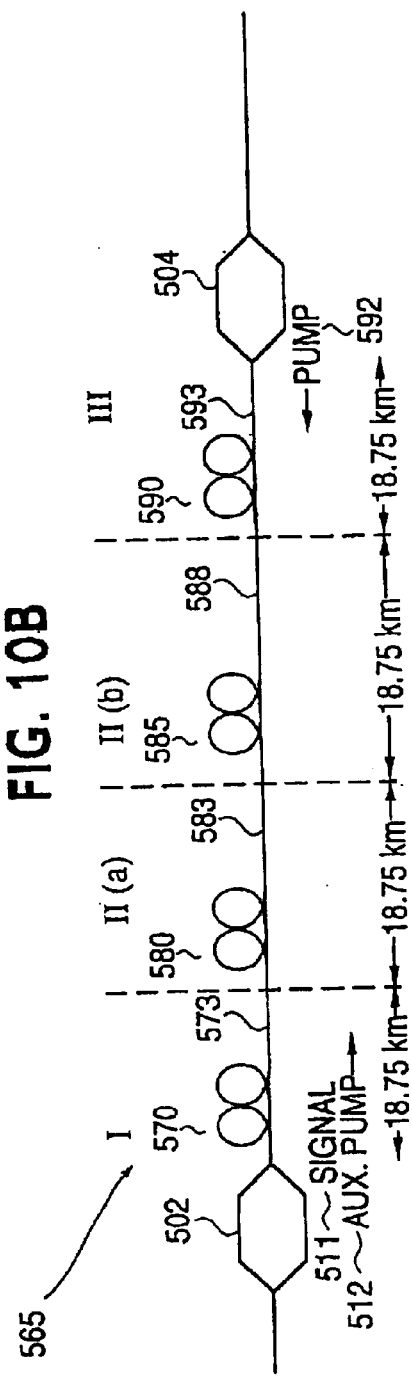

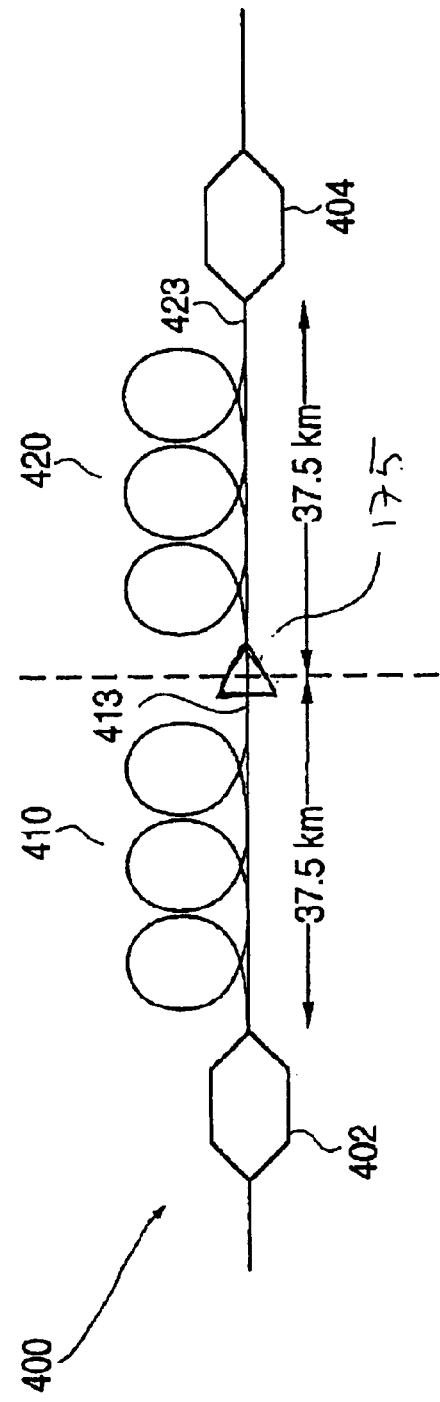
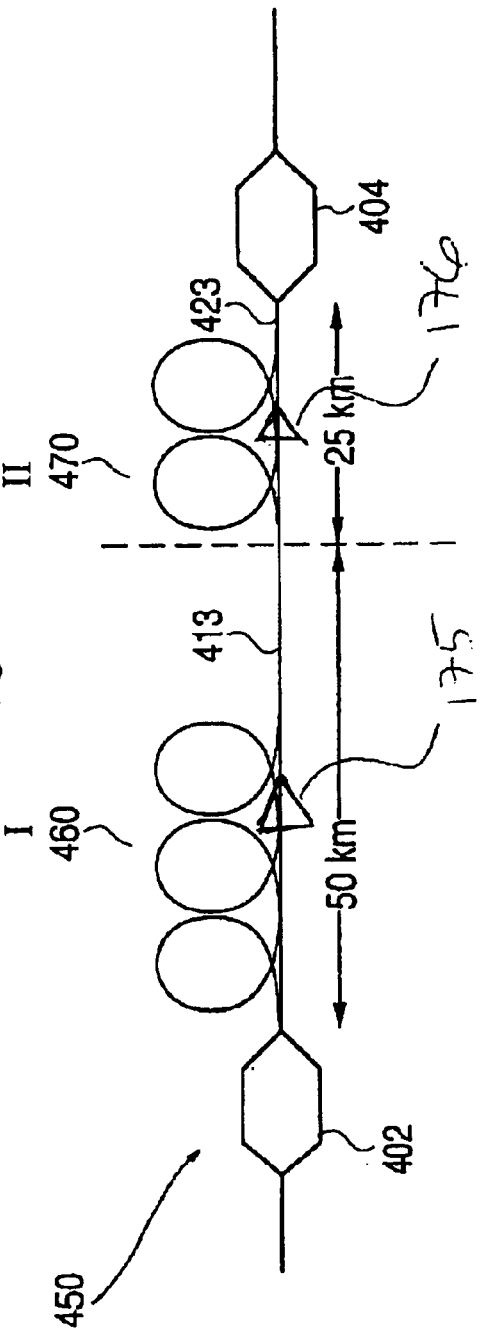
FIG. 18A
FIG. 18B

METHOD AND SYSTEM FOR DISPERSION MAPS AND ENHANCED DISTRIBUTED GAIN EFFECT IN LONG HAUL TELECOMMUNICATIONS USING DISTRIBUTED AND REMOTELY PUMPED ERBIUM-BASED AMPLIFICATION

CROSS REFERENCE TO RELATED APPLICATION

The present application is a continuation-in-part of currently pending and co-owned parent U.S. patent application Ser. No. 09/809,422, entitled "METHOD AND SYSTEM FOR DISPERSION MAPS AND ENHANCED DISTRIBUTED GAIN EFFECT IN LONG HAUL TELECOMMUNICATIONS", by M. Dennis et al., filed on Mar. 16, 2001 now U.S. Pat. No. 6,633,712. The entirety of the disclosure of the parent application is incorporated by reference herein.

BACKGROUND OF THE INVENTION

1. Field of the Invention

The present invention is directed to a method and system for telecommunications and, in particular, for dispersions maps in long haul and ultra-long haul wavelength division multiplexed optical fiber systems with enhanced distributed gain and/or remotely pumped erbium-based amplification.

2. Related Art

Over the past decade, long-haul data transmission capacity has greatly expanded. This capacity expansion is due to a series of technological developments including erbium doped fiber amplifiers (EDFAs), high speed time division multiplexing (TDM), wavelength division multiplexing (WDM), and non-zero dispersion-shifted optical fiber.

However, transmission capacity is ultimately limited by the interplay of transmission impairments (i.e., the degradation of fidelity of the optical data carrier signal) caused by several fundamental physical phenomena, including attenuation, Rayleigh scattering, dispersion, and optical non-linearity of the fiber. Each of these known impairments will now be discussed.

Attenuation: Though the glass used for optical fiber is highly transparent at the wavelengths of radiation used for optical data transmission (about 1250 nm to 1650 nm), fundamental physical processes, such as Rayleigh scattering and Erbach-tail absorption, can cause an exponential decay as a function of fiber length in the energy per bit of an optical data signal. This attenuation is generally greater than 0.15 dB/km for even the most nearly ideal silica-based optical fiber. In the absence of any mechanism for reamplifying the optical signal, this attenuation would limit data transmission to a maximum distance of about 500 km or less. The development of optical amplifiers, such as the EDFA, have enabled transmission over much longer distances by periodically boosting the optical signal to overcome the attenuation.

However, amplifiers can introduce noise in the form of amplified spontaneous emission (ASE) which degrades the optical signal. The degree to which the amplification degrades the signal is determined by the physical properties of the amplifier and also by the total attenuation of the signal prior to amplification, i.e., the distance between amplifiers.

Conventional erbium doped fiber amplifiers (EDFAs) operate, for example, in either the "C-band" (conventional band, at about 1530 nm–1560 nm (±10 nm)) or "L-band" (long wavelength, at about 1570 nm–1605 nm (±10 nm)).

These conventional EDFAs consist of one or more short (e.g., 10–100 m) segments of optical fiber, the core of which is doped with moderately high concentrations of $Er^{3+}$ (about 100–1000 parts per million by weight of the oxide (ppmbw)). Conventionally, the fiber will be contained in a single small package (e.g., 2×10×15 cm) along with a pump laser (either 980 nm or ~1480 nm pump wavelength), and conventional ancillary components (couplers, power converters, monitor and control electronics, etc.) Such amplifiers (having such short segments of doped fiber) are referred to as "discrete EDFAs". Alternatives also exist, which include amplifiers comprising erbium-ytterbium co-doped fiber.

Discrete EDFAs have been conventionally used to extend the length of so-called repeaterless (or unrepeatered) transmission links. A link is said to be repeaterless if it includes no electrically powered equipment, other than at the terminals (the endpoints of the link). Such links are advantageous where electrical power is difficult or expensive to obtain locally, but is readily available at the terminals. It is advantageous for short-distance (e.g., <600 km) undersea links, as it obviates the need for high voltage power feed equipment at the terminals, and can simplify the design of the transmission cable. However, the attenuation of an ideal optical fiber is >0.15 dB/km, and limits the practical length of such a span with no in-line amplification to about 200–500 km (depending on the channel and aggregate data rates). Discrete EDFAs as described above thus require at least some electrical power to drive the pump laser(s).

An alternative to EDFAs is to use distributed amplification. For example, distributed Raman amplification (DRA) involves launching an optical pump signal, along with the data signal (conventionally counter-propagating) into the fiber composing the transmission span. The wavelength and power (or intensity) of the pump signal is selected to induce stimulated Raman scattering (SRS) within the fiber, so as to amplify the data signal. Contrary to the case for an EDFA, which is essentially a discrete device, the amplification based on SRS may be arranged to be distributed over a large fraction of the transmission span between repeaters.

For example, FIG. 1 shows a plot of relative signal power (in dB) as a function of distance (km) for EDFA versus DRA. FIG. 1 compares the evolution of the signal power over a typical repeater span distance (about 75 km) for transmission with EDFA based (discrete) repeaters and DRA. The degradation of the data signal by ASE noise will be greater in the EDFA case as the maximum loss [minimum signal power] is greater [less] than for the DRA case.

Dispersion: The speed of light (as measured in group velocity) in a material such as silica optical fiber varies significantly with the particular wavelength of the optical signal. This phenomenon is known as group velocity dispersion (GVD, or also referred to as group delay dispersion, GDD). This GVD affects transmission of an optical data signal as the signal must be comprised of a band of wavelengths in order to carry information.

For example, a pulse of light representing an isolated "1" bit will be composed of wavelengths with a spectral bandwidth approximately equal to the inverse of the temporal duration of the pulse. After propagation over a full transmission link, if the total group delay for the shortest wavelengths differs from the delay for the longest wavelengths by more than about one bit period, then a significant fraction (e.g., >25%) of the energy for that "1" bit will spill over into the time slots of neighboring "0" bits. This "spill-over" results in inter-symbol interference (ISI), whereby the values of the "1" bit and its neighbors may be determined erroneously at the terminus of the transmission link (such as at the receiver of a conventional transmission span).

For ideal linear transmission (i.e., neglecting the nonlinear impairments described below), the ISI may be eliminated by arranging for the total dispersion of the transmission link to be essentially zero. To this end, optical fibers have been developed with very low dispersion in the wavelength range of interest, such as dispersion shifted fibers (DSF). However, this particular approach has proven disadvantageous due to nonlinear optical effects.

Alternatively, dispersion compensating fibers (DCF) have been developed to cancel the dispersion of standard single-mode fibers (SMF, i.e., fibers with a zero-dispersion wavelength of about 1310 nm). Transmission spans have also been developed consisting of so-called non-zero dispersion shifted fibers (NZD). For this approach, two types of fibers are alternated in the link. The two fibers are similar in design to the DSF fibers, but with small, non-zero dispersions in the bands of the alternating wavelengths approximately equal in magnitude but of opposite sign; the magnitude of the dispersions are midway between the SMF and DSF fibers.

Nonlinearity: Another important class of transmission impairments results from optical Kerr nonlinearity. This nonlinear effect occurs because the index of refraction of the silica fiber transmission medium depends on the intensity of the light being transmitted through the fiber. For a multichannel transmission system, where the optical power is distributed over a very large number of wavelengths, the Kerr effect can cause the following nonlinear optical phenomena:

(1) Self-phase modulation (SPM)—This nonlinear phenomenon is a broadening of the bandwidth of an optical channel due to its own power. This phenomenon impairs transmission by exacerbating dispersion induced ISI, and can cause interchannel crosstalk in WDM systems with close channel spacing.

(2) Cross-phase modulation (XPM)—This phenomenon is a broadening and/or shifting in frequency of an optical channel induced by the intensity of the other channels. Impairments due to XPM are qualitatively similar in effect to SPM, though they may be quantitatively dominant for systems with large channel counts and close channel spacing.

(3) Four-wave mixing (4WM)—This phenomenon describes the interaction of channels at two separate wavelengths, generating power at a third wavelength, which may overlap and interfere with a third data channel. Four-wave mixing is especially problematic in WDM systems with many channels evenly-spaced in frequency. Particular data channels may be overlapped by mixing products from many pairs of other channels. The effect is equivalent to increasing the noise and/or crosstalk in that channel.

As the Kerr nonlinearity operates on the light intensity (optical power per unit area), these nonlinear effects may be mitigated either by using low optical powers or by using fibers with relatively large effective mode field areas ($A_{eff}$), i.e., with a core size that is as large as practical but still single mode. The 4WM is a coherent effect, and so may be mitigated by constructing the transmission link from alternating types of NZD as described previously.

SUMMARY OF THE INVENTION

Thus, what is needed is a method and system for optical communications which takes into account each of the aforementioned impairments.

According to a first embodiment, a transmission span for a telecommunications link comprises a first segment comprising a first optical fiber having a first fiber length and a first physical property, a second segment comprising a second optical fiber having a second fiber length and a second physical property, and a third segment comprising a third optical fiber having a third fiber length and a third physical property. The first and third segments are optically coupled to opposing ends of the second segment and at least one of the first and third physical properties is different from the second physical property, where the first segment provides low nonlinearity, the third segment provides distributed gain, and the second segment compensates for the dispersion of the first and third segments. The transmission span further includes a fourth optical fiber doped with a non-zero concentration of $Er^{3+}$, where the fourth optical fiber is disposed at a location in the span for remote pumping. The location can be within the first segment, within the second segment, within the third segment, at an interface between the first and second segments, and/or at an interface between the second and the third segments. The fourth optical fiber provides discrete amplification of the optical signal. In a preferred aspect, the $Er^{3+}$ dopant concentration is from about 100 parts per million (ppm) by weight to about 1000 ppm by weight and a length of the fourth optical fiber is from about 10 m to about 100 m. Also, preferably, the fourth optical fiber is disposed at a location in the span that reduces a signal-to-noise degradation.

In another aspect, a method of providing a transmission span that (1) compensates for signal attenuation, dispersion, and nonlinearity of an optical signal communicated between two line units and (2) provides distributed amplification, comprises dividing the transmission span into a plurality of fiber segments and selecting a different fiber for each of the segments so that a first segment provides low nonlinearity, a third segment provides distributed gain, and a second segment compensates for the dispersion of the first and third segments, where the dispersion is based on a dispersion condition and a dispersion slope condition for the span. The method further comprises inserting an $Er^{3+}$ doped optical fiber into the transmission span at a selected location. The location can be within the first segment, within the second segment, within the third segment, at an interface between the first and second segments, and/or at an interface between the second and the third segments, where the $Er^{3+}$ doped optical fiber provides discrete amplification of the optical signal. In a preferred aspect, the $Er^{3+}$ doped optical fiber is inserted at a location at least 2 kilometers in distance from both of the line units.

In yet another aspect, a telecommunications system for communicating an optical signal comprises a first transmission span that includes a first segment comprising a first optical fiber having a first fiber length and a first physical property, a second segment comprising a second optical fiber having a second fiber length and a second physical property, and a third segment comprising a third optical fiber having a third fiber length and a third physical property. The first and third segments are optically coupled to opposing ends of the second segment, where at least one of the second and third physical properties is different from the first physical property, and where the first segment provides low nonlinearity, the third segment provides primary distributed gain, and the second segment compensates for the dispersion of the first and second segments. The system further comprises a fourth optical fiber doped with a non-zero concentration of $Er^{3+}$ disposed at a location in the span for remote pumping. The location can be within the first segment, within the second segment, within the third segment, at an interface between the first and second segments, and/or at an interface between the second and the third segments, where the fourth optical fiber provides discrete amplification of the optical signal. The system also comprises a first line unit disposed at a first end of the first transmission span and a second line unit disposed at a second end of the first transmission span. The optical signal propagates from the first line unit to the second line unit along the first span in a first direction. The second line unit provides a plurality of pump beams into the first span in a second direction opposite to the first direction to provide remote pumping for discrete Erbium amplification and distributed Raman amplification of the optical signal.

In an alternative aspect, a transmission span for a telecommunications link comprises a first segment comprising a first optical fiber having a first fiber length and a first physical property and a second segment comprising a second optical fiber having a second fiber length and a second physical property different from the first physical property. The first segment is optically coupled to the second segment. The first optical fiber mitigates nonlinearity and the second optical fiber provides dispersion compensation for the first fiber and a distributed gain medium. The first optical fiber can be a SMF type fiber, SCF type fiber, or NDSF type fiber having an effective mode field area of from about 70 $\mu m^2$ to about 120 $\mu m^2$. The second optical fiber can be an inverse dispersion type fiber having an effective mode field area of about 15 $\mu m^2$ to about 40 $\mu m^2$. The span further includes a third optical fiber doped with a non-zero concentration of $Er^{3+}$, where the third optical fiber is disposed at a location in the span for remote pumping. The location can be within the first segment, within the second segment, and/or at an interface between the first and second segments, where the third optical fiber provides discrete amplification of the optical signal.

Further features and advantages of the invention, as well as the structure and operation of various embodiments of the invention, are described in detail below with reference to the accompanying drawings.

BRIEF DESCRIPTION OF THE DRAWINGS

The accompanying drawings, which are incorporated herein and form part of the specification, illustrate, but do not limit, the present invention and, together with the description, further serve to explain the principles of the invention and to enable a person skilled in the pertinent art to make and use the invention.

FIG. 7A shows an alternative three-fiber type map with an alternative fiber type order according to an alternative embodiment of the present invention.

FIG. 7B shows an alternative three-fiber type map with asymmetric segment lengths according to an alternative embodiment of the present invention.

FIG. 8A shows an alternative three-segment map constructed from only two types of fiber, where the relative total lengths of the two fiber types are determined by their dispersion characteristics and the actual segment lengths are determined so as to optimize overall system performance, according to an alternative embodiment of the present invention.

FIG. 8B shows another alternative three-segment map constructed from only two types of fiber, where the relative total lengths of the two fiber types are determined by their dispersion characteristics and the actual segment lengths are determined so as to optimize overall system performance, according to an alternative embodiment of the present invention.

FIG. 8C shows a plot of relative noise factor (NF) as a function of fiber length for a segment III fiber in an example two fiber, three segment map.

FIG. 9A shows an alternative two-segment map having a symmetric segment-length map, e.g., for application with SMF plus 1×IDF, according to an alternative embodiment of the present invention.

FIG. 9B shows an alternative two-segment map having an asymmetric segment-length map, e.g., for SMF plus 2×IDF, according to an alternative embodiment of the present invention.

FIG. 10A shows an alternative four-fiber dispersion map with a double period, (i.e., with a periodicity of two repeater spans), where segments I(a) and I(b) are identical to one another, as are segments III(a) and III(b), while segments II(a) and II(b) are different and are designed to compensate, respectively, segments I(a)+I(b) and segments III(a)+III(b), according to an alternative embodiment of the present invention.

FIG. 10B shows a single period four-segment map where segment II(a) is designed to compensate segments III, and segment II(b) is designed to compensate segment I, according to an alternative embodiment of the present invention.

FIGS. 18A and 18B show example two-segment dispersion maps for a long-haul transmission system having a remote erbium doped amplification (rEDFA) scheme according to a further alternative aspect.

DETAILED DESCRIPTION OF THE PREFERRED EMBODIMENTS

The present invention is directed to a method and system for telecommunications and, in particular, for dispersions maps in long haul and ultra-long haul optical fibers using a distributed amplification scheme and/or remotely pumped erbium-based amplification. For example, in a preferred embodiment of the present invention, an optimized transmission link can be designed that mitigates the aforementioned transmission impairments. The transmission link can be constructed from a plurality of different fiber types, where each span within the link can include a number of segments of each fiber type per span. Each link, thus, can include multiple repeating spans. Further, conventional fibers that can be practically produced in large quantities can be utilized. Accordingly, a system designer can construct a data transmission system that accounts for transmission impairments by selecting constituent optical fibers and arranging the constituent optical fibers within the transmission link in the manner described below.

In addition, the arrangement of fiber types and fiber lengths within the span can be appropriately selected to provide an improved noise factor. Thus, the system and method of the present invention can be utilized to design a transmission link for practical cabling, particularly with regard to submarine applications.

Figure 2:
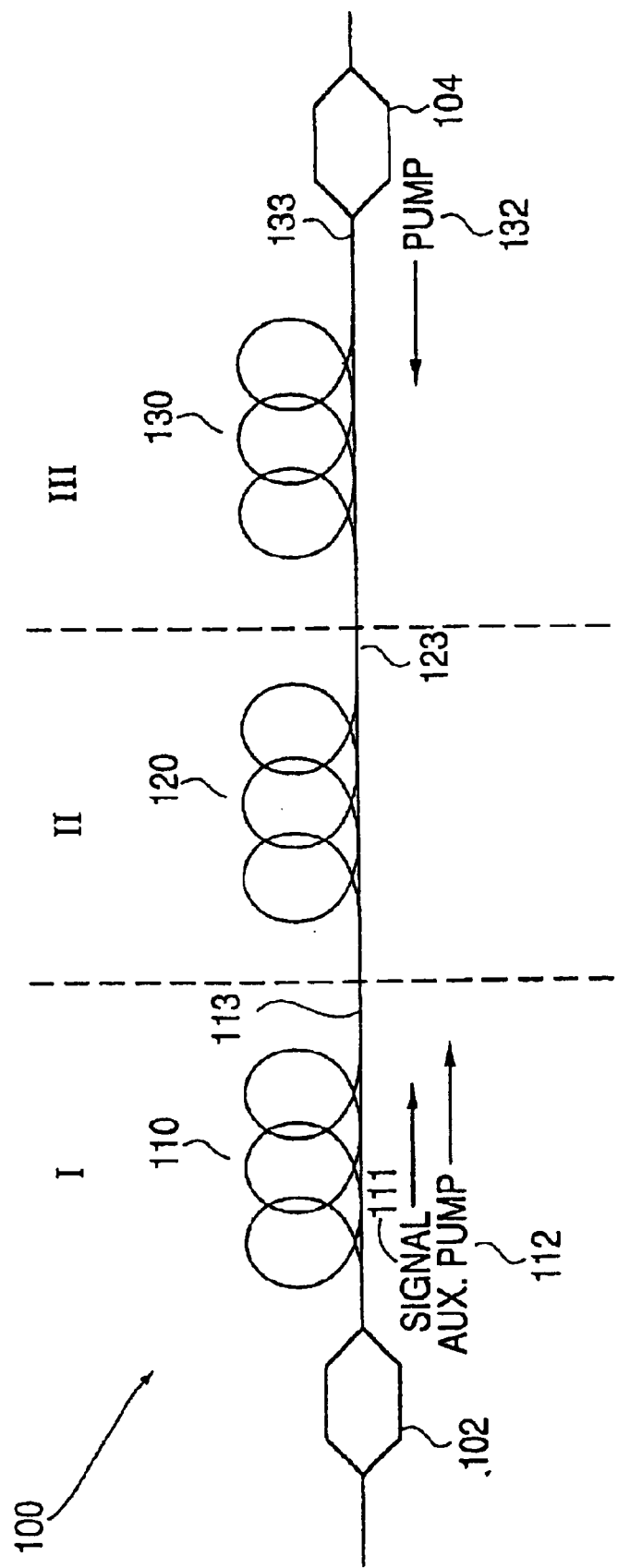
FIG. 2 shows a three-segment dispersion map for a long-haul transmission system according to an embodiment of the present invention.

FIG. 2 shows a map of an exemplary transmission span 100, which can be included in a complete transmission link, such as a submarine link between terrestrial stations. Alternatively, transmission span 100 can be part of a larger terrestrial transmission link. For purposes of this description, the term "link" or "transmission link" refers to a transmission line between an optical signal transmitter and an optical signal receiver. By "span" or "transmission span" it is meant the portion of the link between pump signal inputs, so that, for example, the end points of transmission span 100 include line units 102 and 104. By "line unit" it is meant a point in the transmission link where a pump is injected into the optical fiber. Line units 102, 104 can also provide transmission monitoring, component diagnostics, and other conventional telecommunications capabilities, similar to those performed by conventional repeater units. In addition, the line units can provide for equalizing the net gain of the span across the plurality of wavelength channels.

Transmission span 100 includes a plurality of segments. In the embodiment shown in FIG. 2, transmission span 100 includes a first segment 110, which comprises fiber 113, a second segment 120, which comprises fiber 123, and a third segment 130, which comprises fiber 133, where these segments are also referred to herein as segment I, segment II, and segment III. In this embodiment, the fiber of each segment has one or more different physical characteristics from the fiber(s) of the other segment(s) within the same span. These physical characteristics can include dispersion properties, dispersion slope properties, fiber composition (including core and cladding compositions), effective mode field area, Raman gain coefficient, and nonlinearity (e.g. Kerr coefficients). The fibers can be attached to one another (e.g., segment I can be attached to segment II) with conventional fusion splicing techniques and the like. Alternatively, a single drawn fiber can be utilized, where the differing physical characteristics defining each different segment are inherent in the particular fiber used. For example, a fiber having sections of different effective mode field areas (such as through the use of tapered cores) can be utilized.

However, the present invention is not limited to a particular number of segments within a span. For example, FIGS. 9A, 9B, 10A, and 10B, described in greater detail below, show alternative numbers of segments within each span, such that the present invention can be utilized for spans having two or more segments. In addition, different segments are not required to have different physical characteristics from each of the other segments within a span. For example, FIGS. 8A and 8B, described in greater detail below, show alternative embodiments where the span comprises three segments, where two of the segments are of the same fiber type.

According to a preferred embodiment of the present invention, the map shown in FIG. 2, and the features of the segments shown therein, can be designed by taking into account the following physical and phenomenological characteristics: distributed amplification, dispersion, and nonlinearity. Other considerations, such as cabling complexity, fiber loss characteristics, effective mode field area, zero dispersion wavelengths, and the like, can also be taken into account.

According to a preferred embodiment of the system shown in FIG. 2, segment I (110) is designed to mitigate non-linear effects, segment II (120) is designed to compensate for dispersion, and segment III is designed to compensate for transmission loss by providing a gain medium for amplification of the optical signal 111. Of course, the arrangement of these segments can be altered, as would be apparent to one of ordinary skill in the art given the present description. In addition fewer or more segments can be provided to further compensate for other transmission impairments.

Figure 11:
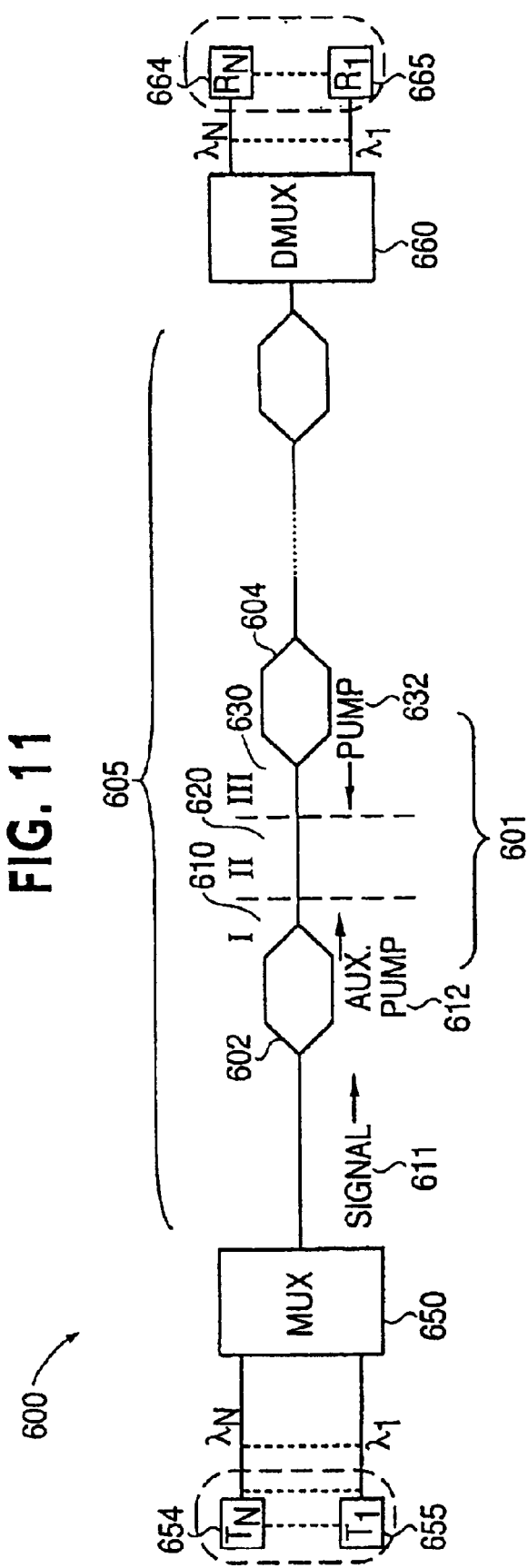
FIG. 11 shows an optical data transmission system incorporating a three segment fiber span according to another embodiment of the present invention.

For purposes of this description, the optical signal 111 can be a conventional multiplexed (e.g., WDM, DWDM, and the like), modulated (e.g., 2.5 Gb/s, 10 Gb/s, and higher) data signal that is transmitted along a link (see FIG. 11) that includes the span 100 from a conventional transmitter (see FIG. 11) to a conventional receiver (see FIG. 11). The optical (data) signal 111 can have a high aggregate data rate (e.g., >2 Tb/s). In the embodiments described herein, the optical signal 111 can be transmitted in the preferred mid-IR telecommunications wavelength region (1400 nm–1650 nm). However, the method and system of the present invention are not limited to this communications band. Alternative wavelength regions (e.g., at about 1300 nm) can be utilized, as would be apparent to those of ordinary skill in the art, given the present description.

According to a preferred aspect of this embodiment, segment I (110) is designed to provide low nonlinearity. By "low nonlinearity" for the transmission span, it is meant that the accumulated nonlinearity over the span is small compared to that for a conventional span (e.g., a span comprising a conventional NZD fiber type) of comparable length and of equivalent noise figure based on discrete amplification. In this respect, an optical fiber 113 having a large effective mode field area ($A_{eff}$) can be selected, where $A_{eff}$ represents the size of the mode supported by the core of the fiber. Preferably, an $A_{eff}$ approximate in size to the total area of the core can be selected. For example, the $A_{eff}$ for this segment can be from about 70 $\mu m^2$ to about 120 $\mu m^2$ can be utilized.

In addition, segment I can be selected to provide low signal attenuation. For example, a low loss silica core fiber (see e.g., Table I described below, which shows a number of conventional fibers for segment I) can be utilized. Other types of fiber can also be utilized, as would be apparent to one of ordinary skill in the art given the present description. Preferably, the optical data signal power averaged over distance in segment I is large as compared to that in the other segments. Further exemplary characteristics of segment I are described in further detail below.

According to a preferred embodiment of the system shown in FIG. 2, segment II (120) is designed to compensate for the dispersion characteristics of the span. In particular, the overall dispersion in span 100 can be compensated by providing one or more particular segments, here segment II (120), to compensate for the dispersion characteristics of segment I, and preferably segments I and III (110 and 130), such that dispersion of span 100 is near zero, per the dispersion condition described in detail below.

According to a preferred embodiment of the present invention, the net dispersion of the span 100 should be relatively very small. Due primarily to 4WM, it is preferable that the magnitude of the local dispersion (i.e., the dispersion value at any point in the fiber) be substantially non-zero. If the total link dispersion is non-zero, XPM impairments and any cross-talk between the WDM channels via, e.g., Raman gain, can be minimized.

As is known, GVD is not independent of wavelength. Thus, as telecommunications continues to expand to transmission systems having a very large optical bandwidth (e.g., about 100 nm or more, nominally within but not necessarily limited to the band 1450–1650 nm wavelength), it is preferable to account for the variation of the GVD with wavelength, which is referred to as third order dispersion (TOD) or dispersion slope D', which is defined by the equation dD/dλ (where "D" is the dispersion and λ is the wavelength). This dispersion slope D' may result in large net dispersions at the edges of the band, even if the net GVD is zero at the middle of the band. Thus, as the inventors have determined, a feature of a preferred aspect of the present invention is to compensate the TOD as well.

For the span 100 shown in FIG. 2, a dispersion condition ($D_c$) for the span can be expressed by:

$$D_c = \frac{1}{L}|D_1 L_1 + D_2 L_2 + D_3 L_3| \approx \Delta,$$

where $D_1$ is a first dispersion coefficient for the first segment, $L_1$ is the first fiber length, $D_2$ is a second dispersion coefficient for the second segment, $L_2$ is the second fiber length; and $D_3$ is a third dispersion coefficient for the second segment, and $L_3$ is the third fiber length, and L is the total span length. A dispersion slope condition ($D'_c$) for the span, which is optimally kept as small as possible, can be expressed by:

$$D'_c = \frac{1}{L}|D'_1 L_1 + D'_2 L_2 + D'_3 L_3| \cdot \frac{\delta \lambda}{2} \ll \Delta,$$

where $D'_1$ is a first dispersion slope for the first segment, $D'_2$ is a second dispersion slope for the second segment, $D'_3$ is a third dispersion slope for the third segment, δλ is a total wavelength bandwidth communicated by the span (e.g., 1620 nm−1520 nm=100 nm=δλ), and $0 \leq \Delta \leq 1.0$ ps/nm/km, where Δ is preferably non-zero. Thus, for a transmission link on the order of about 10,000 km, the total link dispersion $\Delta_L$ can be $0 \leq \Delta_L \leq 5000$ ps/nm/km, where, preferably, $\Delta_L$ can be $1000 \leq \Delta_L \leq 3000$ ps/nm/km. For the dispersion slope condition, "<<" corresponds to a quantity that is about a factor of 3 or more less than Δ.

For segment II, an optical fiber having a smaller effective mode field area ($A_{eff}$) can be selected. Preferably, a smaller effective mode field area fiber can be placed in the lower-optical power portion of the span so that nonlinear impairments resulting from the small effective area will be minimized. Preferably, segment II includes a fiber having an $A_{eff}$ of from about 15 $\mu m^2$ to about 40 $\mu m^2$ can be utilized. In addition, the segment II fiber can be a conventional Ge-doped silica fiber. Other types of fiber can also be utilized, (see e.g., Table I described below, which shows a number of conventional fibers for segment II), as would be apparent to one of ordinary skill in the art given the present description.

For a complete system (see e.g., FIG. 11), the total dispersion of the link can further be either pre-compensated at the transmitter, or post-compensated at the receiver, or some combination thereof, so as to optimize the performance of a preferred optical data signal having many WDM channels.

According to a preferred embodiment of the system shown in FIG. 2, segment III (130) can provide a primary or auxiliary gain medium for the optical signal 111. According to this embodiment, this primary or auxiliary amplification can be based primarily on a distributed amplification scheme, such as DRA, or a hybrid amplification scheme that includes both distributed Raman amplification and remotely pumped, discrete erbium amplification.

In a preferred aspect of this embodiment, distributed Raman amplification (DRA) is utilized to provide gain in order to compensate for transmission loss along the span. In this example, distributed Raman amplification is provided by injecting IR radiation (e.g., pump signal 132) from multiple pump lasers into segment III, counter-propagating to the optical (data) signal(s) 111. For example, one or more commercially available IR diode lasers (having output wavelengths from about 1400 nm to about 1505 nm) located in line unit 104 can be utilized to provide a pump source for Raman amplification of signals in the 1520–1620 nm band. Injection of the pump signal 132, which can include one or more Raman pump wavelengths of the same or varying intensity, can be accomplished by utilizing conventional dichroic mirrors and the like to direct a counter-propagating pump beam into fiber 133. In addition, the pump lasers can be advantageously selected to be located on a regularly spaced wavelength grid, though the grid may be populated sparsely. Other techniques for providing distributed amplification will be apparent to those of ordinary skill in the art given the present description.

In an alternative embodiment, the system can employ a discrete Raman pumping scheme.

As described below, Table III provides one preferred example distributed Raman amplification pump scheme, where eight pump lasers of output wavelengths (selected according to the Raman gain profile for the particular fiber used in segment III), are provided.

In an alternative embodiment, auxiliary pumping may be additionally provided by injecting one or more pump signals 112 into Segment I (110) that are co-propagating with the optical (data) signals 111. Preferably, the auxiliary pump source is one or more low noise diode lasers located in line unit 102. In this alternative embodiment, the wavelengths and powers of the pump lasers can be selected to provide as flat a gain as possible (i.e., with minimum deviation in gain from channel to channel). See Table III for an example Raman pump scheme with both counter-propagating and co-propagating pump sources.

Preferably, with respect to flat Raman gain profiles, residual deviations in gain flatness can be corrected periodically within the system, e.g., by using gain flattening filters (GFFs). Other techniques for providing a flat gain are also contemplated.

For segment III, a fiber can be selected that has a relatively larger $A_{\mathit{eff}}$ as compared to segment II, and a comparable or smaller $A_{\mathit{eff}}$ as compared to segment I. For example, the segment III fiber 133 can have an $A_{\mathit{eff}}$ of from about 45 $\mu m^2$ to about 70 $\mu m^2$. An exemplary fiber composition for segment III can be a silica-clad, Ge-doped silica core fiber. Other types of fiber can also be utilized, (see e.g., Table I described below, which shows a number of conventional fibers for segment III), as would be apparent to one of ordinary skill in the art given the present description.

Table I lists the properties for a variety of optical fibers taken either from commercially available vendor specifications, or from published data on experimental fibers. Several different example segment selections for span 100, based on the features of the invention, will be described below for illustrative purposes.

TABLE I

| Fiber Type | Segment Loction | Effective Area (1550 nm), $A_{\mathrm{eff}}$ ($\mu m^2$) | Dispersion (1550 nm), D (ps/nm/km) | Dispersion Slope (1550 nm), D' (ps/nm$^2$/km) | Zero-dispersion wavelength, $\lambda_0$ (nm) | Attenuation (1550 nm), $\alpha$1550 (dB/km) | Attenuation (1385 nm), $\alpha$1385 (dB/km) |
|---|---|---|---|---|---|---|---|
| Corning SMF-28 (SMF) | I | 85 | 17 | 0.060 | 1310 | 0.20–0.25 | <2.0 |
| Lucent Matched Clad (SMF) | I | 85 | 17 | 0.060 | 1310 | 0.20–0.25 | <1.0 |
| Lucent AllWave (SMF) | I | 85 | 17 | 0.60–0.65 | 1310 | 0.19–0.23 | <0.32 |
| SCF (silica core fiber, typical values)* | I | 80 | ~14 | — | — | 0.173 | — |
| NDSF (non-dispersion shifted fiber)** | I | 107 | 20.2 | 0.062 | <1300 est. | 0.192 | — |
| Lucent TrueWave-RS | III | 55 | 3.0–5.3 | <0.050 (0.045 typ.) | 1450–1510 | 0.20–0.21 | <1.0 |
| Lucent TrueWave-SRS | III | 50 | (−4.8)–(−1.4) | <0.050 | 1580–1635 | <0.215 | — |
| Lucent TrueWave-XL | III | 72 | (−4.6)–(−1.4) | <0.112 | 1565–1590 | 0.20–0.21 | <1.0 |
| Corning LEAF | III | 72 | 4.0 | <0.114 | 1510–1520 | <0.25 | <1.0 |
| Corning SMF-LS | III | 55 | 2.0–5.0 | <0.08 | 1510–1530 | 0.20–0.25 | — |
| Corning MetroCor | III | 50 | (−7.5) | 0.12 | 1610–1620 | <0.25 | <0.4 |
| IDF × 1 (inverse dispersion fiber)*** | II | 36 | (−20.8) | −0.067 | — | 0.235 | — |
| IDF × 2 (double inverse disp. fiber)** | II | 31 | (−40.8) | (−0.124) | — | 0.251 | — |
| IDF × 3 (triple inverse disp. Fiber)*** | II | 26 | (−54.2) | (−0.168) | — | 0.292 | — |
| DCF (disp. Compensating fiber)*** | II | 19 | (−95) | (−0.32) | — | 0.50 | — |

In Table I, * corresponds to values found in P. B. Hansen, et al., "Unrepeatered WDM transmission experiment with 8 channels of 10 Gb/s over 352 km", *IEEE Photon. Techn. Lett.*, vol. 8, pp. 1082–1084 (1996);  corresponds to values found in S. N. Knudsen, et al., "New dispersion-slope managed fiber pairs for undersea fiber optic transmission systems", presented at Sub-Optic Conference, 2000; and * corresponds to values found in S. N. Knudsen, M. O. Pedersen and L. Grüner-Nielsen, "Optimisation of dispersion compensating fibres for cabled long-haul applications", *Electron. Lett.* vol. 36 (2000).

Based on the above commercially available and published fiber characteristics, and on the features of the present invention, an exemplary transmission span, such as span 100 shown in FIG. 2, which includes three segments, can be more optimally designed as follows.

For segment I, a suitable low loss/low nonlinearity transmission fiber can be selected, such as an SMF fiber type, an SCF fiber type, or an NDSF fiber type. For example, the optical data signal power averaged over distance in this segment is relatively large, compared to that in the other segments. For most channels, the signal power is a maximum at the end of segment III, even under a partial forward Raman pumping scheme. Under this design, segment I does not provide the primary Raman gain. The mode field area is thus unrestricted and may advantageously be selected to be relatively large to minimize the accumulation of nonlinear impairments. It is further preferable to select a fiber with the minimum possible attenuation for segment I so as to minimize the noise figure of the span. The dispersion for segment I can be unrestricted, although it is preferable to be as small as practicable.

The requirements of large effective mode field area and low loss throughout an exemplary 1500–1625 nm band are met by standard single mode fibers (SMF type), having non-shifted dispersion, originally designed for transmission in the second telecommunications window (at about 1310 nm). Suitable fibers can include, for example, Corning SMF-28 or Lucent Matched Clad. Alternative candidates include similar but improved fibers such as Lucent All-Wave, which is fabricated to suppress absorption on the O—H bond resonance at about 1385 nm. This suppressed absorption feature can be advantageous for implementations involving forward Raman pumping, as the loss is slightly reduced in the pump band. Alternative fiber compositions include fibers having large areas (e.g., NDSF type, with $A_{eff} \approx 100\text{--}120\ \mu m^2$) to further suppress nonlinear impairments. Selection of these types of fibers should take into account bend sensitivity characteristics (e.g., some experimental fibers show a substantial loss induced by bends at ≦50 mm diameter), especially at longer wavelengths (i.e., >1600 nm). A further alternative can be a special low-loss silica-core fiber (SCF), such as has been used experimentally for repeaterless transmission links (i.e., point-to-point data links with no in-line amplification.) Such fibers can have attenuations of <0.17 dB/km, with other properties similar to SMF. The reduced attenuation is preferable because it can yield an improved noise figure per span. Alternatively, the span can be made longer without degrading the noise figure.

For segment II, a suitable fiber having dispersion compensation and secondary gain can be utilized. This segment is preferably capable of compensating the total dispersion of segments I and III, both in GVD and in slope. Such fibers can have a comparatively small mode field area (e.g., 15–40 $\mu m^2$), which provides significant Raman gain pumped by the residual pump that has been transmitted through Segment III (backward (counter-propagating) pumping) or Segment I (forward (co-propagating) pumping). To reduce nonlinear impairments enhanced by the small mode field area of these fibers, it is also preferable to locate the dispersion compensating fiber in this middle segment, where the signal power will be a minimum for most channels.

According to one aspect of this embodiment, a fiber type referred to as "inverse dispersion fibers" (IDF) can be selected for segment II. An IDF is a fiber with dispersion and dispersion slope properties designed so that it may be used to cancel the dispersion and dispersion slope of SMF type fiber or the like when used in the appropriate length ratio (referred to as the "compensation ratio" herein). The compensation ratio is preferably some integer number (e.g., 1× or 2×), but can also be an arbitrary compensation ratio. Properties of several such fibers are included in Table I. For the particular IDF type fibers listed in Table I, the dispersion slope may not be optimal for obtaining a flat dispersion profile (as a function of wavelength), as will become apparent from an alternative embodiment described below.

For segment III, a suitable fiber having primary distributed gain/low dispersion transmission characteristics can be selected. For example, for a DRA scheme, as shown in FIG. 2, the Raman pump signals 132 can be injected at the end of segment III (at line unit 104), counter-propagating to the optical (data) signal 111. To provide acceptable powers for the Raman pumps, this segment preferably has a relatively small mode field area as compared to segment I. However, as the signal powers will be greatest in this segment, the mode field area can be selected to be large enough to reduce nonlinear effects. Furthermore, the dispersion slope and attenuation of this segment are preferably small, where the GVD is preferably moderate.

For example, these fiber characteristics can be provided by several different commercially available NZD fibers, which can have a mode field area between SMF and IDF fiber types. As described previously, a NZD fiber type can be selected having an $A_{eff}$ of about 45 $\mu m^2$ to about 70 $\mu m^2$. To facilitate the compensation of dispersion slope, it is preferred that this parameter be as small as possible. From Table I, Lucent TrueWave-RS or TrueWave-SRS, both of which have a D'<0.05 ps/nm/km appear to be logical options. The NZD fibers with expanded mode field areas (e.g., Corning LEAF, Lucent TrueWave-XL) are alternative options with regard to link noise figure, but can have less preferred dispersion slope and increased pump power requirements. In this example, the larger $A_{eff}$ can correspond to higher pump powers, with the salutary effect of distributing more of the gain to the segment II fiber. It is also preferred that the fiber utilized in segment III has a zero dispersion wavelength well outside the operating signal band. When this zero dispersion wavelength condition is a design preference, standard dispersion shifted fibers may not be advantageous (e.g., Corning SMF-LS, Corning SMF/DS, and terrestrial-grade True-Wave from Lucent) for operation in the 1500–1625 nm wavelength band. For this segment, the sign of the dispersion is not critical because as described previously, either the anomalous dispersion TW-RS or the normal dispersion TW-SRS can provide acceptable results.

For embodiments involving other forms of distributed amplification, such as for a distributed erbium amplification scheme or a hybrid distributed erbium/distributed Raman amplification scheme, a suitable fiber can include a fiber comparable in design to the NZD fiber types described previously, but further including an erbium doping at low concentrations.

As described previously, other characteristics can be considered in the design of a transmission span, such as span 100 shown in FIG. 2. For example, with respect to cabling complexity, it can be preferable to deploy a bi-directional transmission system, i.e., a pair of parallel, co-located fiber links transmitting data signals in opposite directions. It can further be preferable that the counter-propagating links be operationally identical, and that the number of different cables implemented within a link be kept to a minimum. These requirements can be accommodated under the preferred design by selecting the lengths of segments I and III to be equal. Although three different fiber types can be used in this embodiment, only two different cable types can be required: One cable can contain an equal number of fibers of the segment I type and the segment III type, and can be used at both ends of the span. The second cable can contain only fibers of the segment II type and can be used only for the middle segment, as will be apparent to one of ordinary skill in the art given the present description.

An example of the preferred embodiment shown in FIG. 2, for a DRA scheme, is further described herein with reference to the example dispersion map and Raman pumping parameters provided in Table II and Table III, respectively. For illustrative purposes, this example of the preferred embodiment will be compared to a conventional system.

In this design, a symmetrical map ($L_1=L_2=L_3$) is provided, with all three segments of equal length. The fiber selection parameters have been previously described. In this example, a standard SMF is provided for segment I, an IDF type fiber is provided for segment II, and an NZD type is provided for Segment III. The fiber parameters are approximate to those listed in Table I for the corresponding commercially available fibers (e.g., Lucent Matched Clad, Lucent TrueWave-RS), as well as for the fiber (1×IDF) to be used in segment II. The map symmetry simplifies cable management. The total map length (75 km) is suitable for trans-oceanic applications; other lengths will be apparent to those of ordinary skill in the art given the present description.

TABLE II

Fiber Parameters for System Simulations

| | Segment I | Segment II | Segment III |
|---|---|---|---|
| Mode Field Area, $A_{eff}$ ($\mu m^2$) | 80 | 30 | 50 |
| Attenuation at 1550 nm, $\alpha$ (dB/km) | 0.20 | 0.235 | 0.20 |
| Dispersion, D (ps/nm/km) | +20 | −20 | +4.5 |
| Dispersion Slope, D' (ps/nm$^2$/km) | +0.06 | −0.06 | +0.06 |
| Length, L (km) | 25 | 25 | 25 |

TABLE III

Example Raman Pump Laser Scheme

| Pump Wavelength (nm) | Direction | Power into Fiber (mW) |
|---|---|---|
| 1410 | Backward | 140.4 |
| 1420 | Backward | 140.4 |
| 1425 | Forward | 85.0 |
| 1435 | Backward | 129.6 |
| 1450 | Backward | 64.8 |
| 1465 | Backward | 43.2 |
| 1480 | Backward | 21.6 |
| 1505 | Backward | 16.2 |

For purposes of this example, it is assumed that seven of the eight Raman pump lasers (all but the 1425 nm Raman pump laser) can be located at a downstream line unit (e.g., line unit 104 from FIG. 2), whereas the output from the 1425 nm pump source is introduced into the transmission fiber at an upstream line unit (e.g., line unit 102 from FIG. 2). Thus, the Raman pumping scheme can be similar in configuration to the preferred embodiment described previously with respect to FIG. 2.

Figure 1:
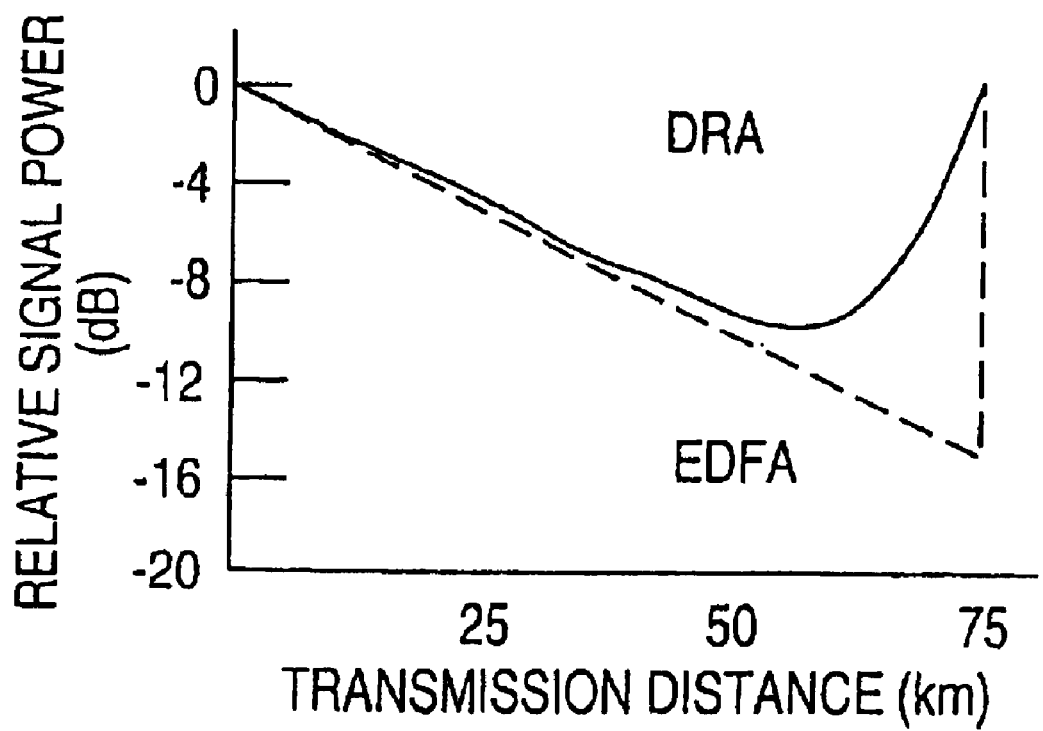
FIG. 1 shows a comparison between data channel power evolution for distributed Raman and erbium doped amplifier based transmission links.
Figure 3:
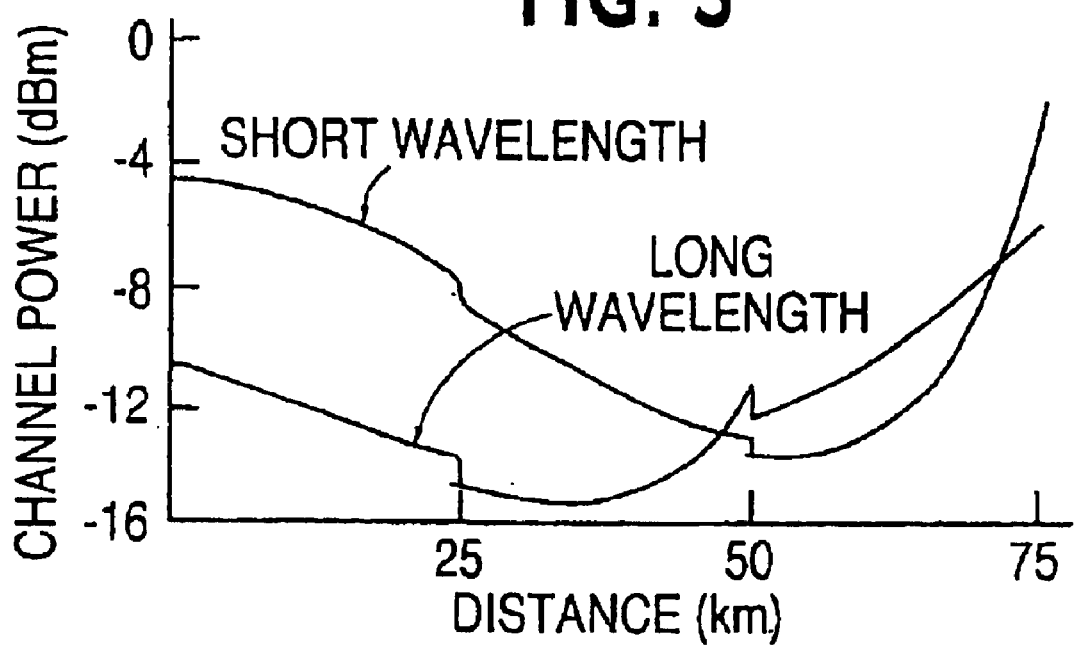
FIG. 3 shows a data channel power evolution for a span with the parameters of Table II, for exemplary long and short wavelength channels, according to an example embodiment of the present invention.
Figure 4:
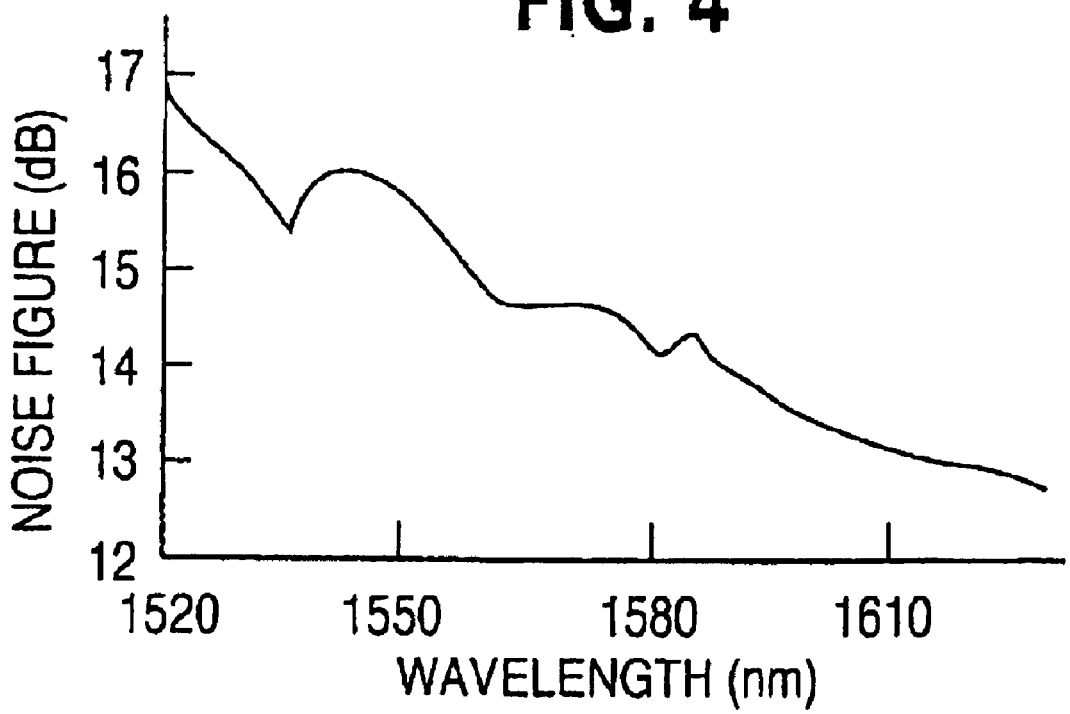
FIG. 4 shows an amplifier noise figure for the span of Table II, according to an example embodiment of the present invention.

FIG. 3 shows an evolution of power for a short wavelength (about 1520 nm) and a long wavelength (about 1620 nm) optical (data) signal over one period (e.g., span 100 shown in FIG. 2) of the dispersion map for the exemplary conditions listed in Table II. In a simulation, a total of 256 data channels were provided, spaced on a 50 GHz frequency grid, with a shortest wavelength being 1520 nm. The input signal powers for each channel were selected to approximately equalize performance for all channels. For this and all simulations described below, the shortest wavelength signal power at the input to the span is −5.8 dBm, with the power of the longer wavelength channels decreasing by 0.04 dB/nm up to the longest wavelength of 1622 nm. The Raman pump powers (see Table III) were selected to provide a maximum net gain over the span of about 3 dB. For the system simulations described below, this net gain is equalized to 0 dB for all channels. Similar to FIG. 1, in this example, Raman amplification reduces the excursion in optical power, especially for the long-wavelength channels, where the excursion value with no Raman amplification would be about 15 dB for a 75 km fiber span. This effect results in improved noise figure across the operating bandwidth, as illustrated by FIG. 4, which shows the noise figure (in dB) as a function of wavelength. For comparison, a conventional 75 km link using discrete (e.g., EDFA) amplification can have a noise figure of >20 dB (assuming a 0.20 dB/km fiber attenuation and 5 dB amplifier noise figure, and approximately 0.5 dB loss at each splice). Thus, this example system can yield an improvement of about 3 dB for even the shorter wavelength channels, which is a substantial improvement for a long-haul transmission system. However, utilizing remotely pumped erbium doped fiber amplifiers (rEDFA) in accordance with preferred embodiments of the present invention can also provide additional benefits, as explained in further detail below.

Figure 5:
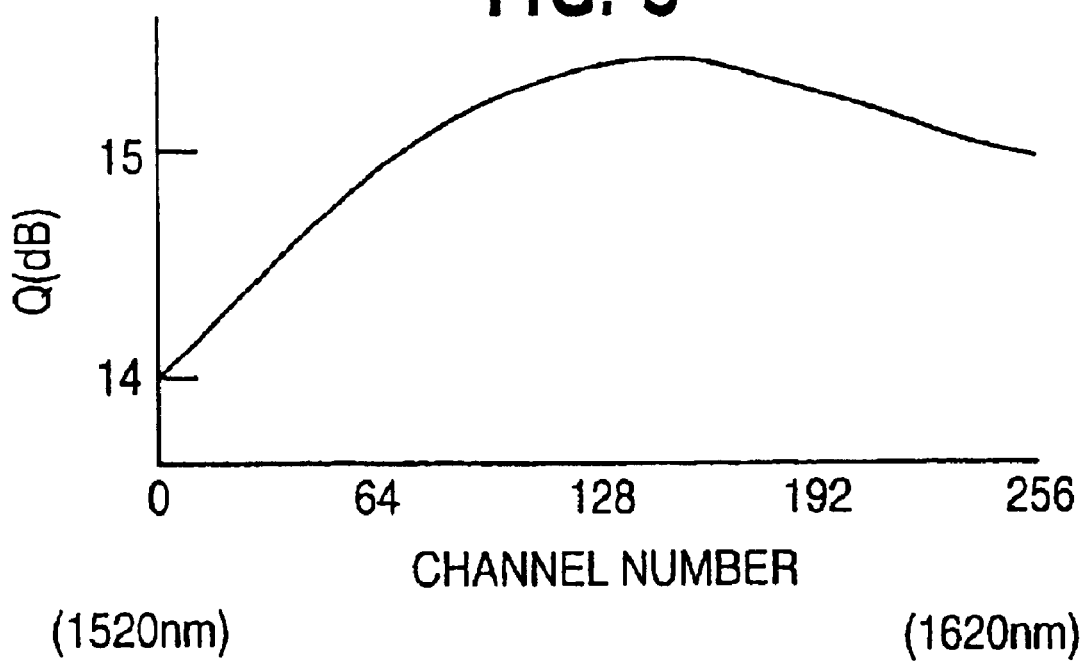
FIG. 5 shows system performance as a function of channel number for the span of Table II, according to an example embodiment of the present invention.

With respect to the reduction of the deleterious effects caused by nonlinear impairments, FIG. 5 shows performance as a function of channel number for a system that includes 100 of the spans described in Table II, for a total link length of 7500 km. Other conditions are as described above. The full system performance takes into account the effects of nonlinearity, dispersion, and Raman amplification noise for the 256 channel system. The Q factor, which can be used to quantify the overall performance of the link, is calculated as follows:

$$Q = 20\log\left(\frac{V_1 - V_0}{\sigma_1 + \sigma_0}\right)$$

In the above equation, $V_1-V_0$ is the difference between the minimum receiver level for the 1 bits and the maximum level for the 0 bits and $\sigma_1$ and $\sigma_2$ are the linear noise loadings for the 0 and 1 levels. A return to zero coding format with 33% duty cycle was used for the simulations.

Figure 6:
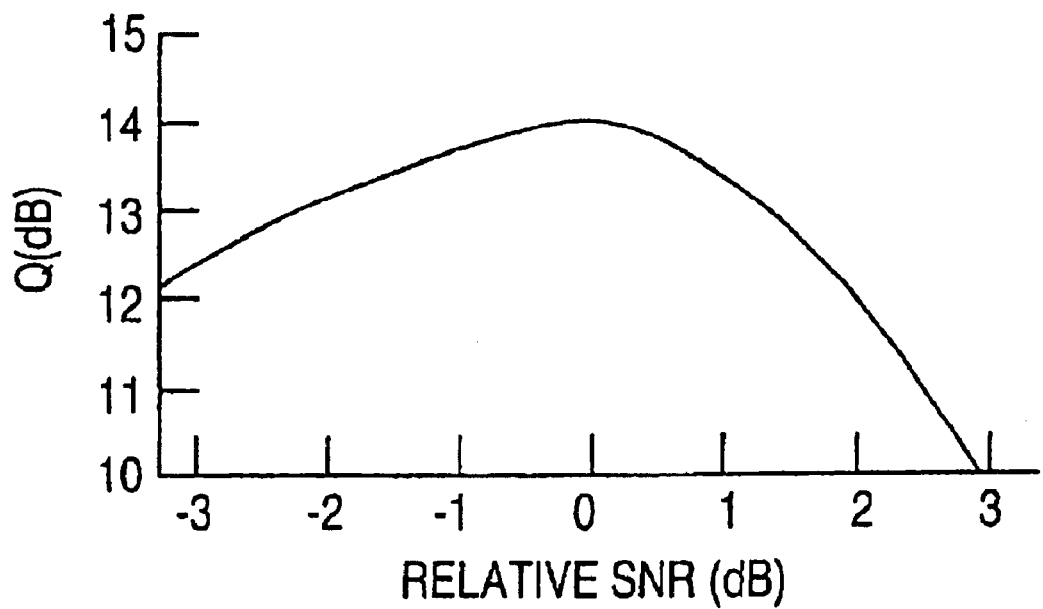
FIG. 6 shows a nonlinear performance for the span of Table II, according to an example embodiment of the present invention.

FIG. 6 shows the Q for a typical short-wavelength channel only, as all longer wavelengths have better noise figure performance. FIG. 6 shows that there is a substantial range (about 4.5 dB) of relative signal-to-noise ratios (i.e., optical data channel powers) yielding a Q of >13 dB. This level of performance is adequate for a long haul transmission system employing forward error correction in the data encoding format.

As would be apparent to those of ordinary skill in the art given the present description, the above system and dispersion map parameters can be utilized for a transmission link having a plurality of spans of same or differing lengths, with each span having two or more different fiber segments. Thus, according to an alternative embodiment of the present invention, a transmission span can have j segments of varying fiber types, so that:

$$D_c = \frac{1}{L}\left|\sum_j D_j L_j\right| \approx \Delta,$$

where $D_j$, $L_j$ are the dispersion and length (respectively) of the segments summed over the periodicity. As with the embodiments described previously, the $\Delta$ value for the span can be $0 \leq \Delta \leq 1.0$ ps/nm/km, where $\Delta$ is preferably non-zero. The value of the total link dispersion $\Delta_L$ is preferably $0 \leq \Delta_L \leq 5000$ ps/nm/km, and more preferably $1000 \leq \Delta_L \leq 3000$ ps/nm/km, e.g., for an overall transmission link distance on the order of 10,000 km. The dispersion slope can be expressed as follows:

$$D'_c = \frac{1}{L}\left|\sum_j D'_j L_j\right| \cdot \frac{\delta\lambda}{2} << \Delta,$$

where $\delta\lambda$ is the total wavelength bandwidth of the system (e.g., 1620 nm–1520 nm=100 nm=$\delta\lambda$). In addition, the period over which the full map repeats can be, e.g., 1, 2, 4, or more spans.

Accordingly, FIGS. 7–10 show a variety of alternative configurations for transmission spans within a practical transmission link. In each of these alternative embodiments, a total span length of 75 km is shown. However, other span lengths, either longer (e.g., 100 km) or shorter (e.g., 50 km), can be utilized, as would be apparent to one of ordinary skill in the art given the present description.

For example, in FIGS. 7A and 7B, alternative three segment spans are shown, where segment maps are shown for both symmetrical (same length per segment) and asymmetrical (at least one segment of different length) spans. In FIG. 7A, a span 200 is shown. Each of the segments has a length of about 25 km in this alternative embodiment. While similar to the embodiment shown in FIG. 2, span 200 differs from span 100 in that a third segment 230 (segment III) is disposed between a first segment 210 (segment I) and a second segment 220 (segment II). Span 200 also includes line units 202 and 204, similar to line units 102 and 104 described above for FIG. 2. Thus, in a DRA scheme, the Raman pump 232 can be introduced into segment II at line unit 204. In this configuration, fiber 213 can be a standard single mode fiber (SMF), fiber 223 can be a fiber having dispersion compensation and secondary Raman gain, such as an inverse dispersion fiber (IDF), and fiber 233 can be a commercially available non-zero dispersion shifted fiber (NZD). By reversing the order of the small $A_{eff}$ IDF and the larger $A_{eff}$ NZD (segments II and III), linear performance (NF) can be degraded slightly, pump power requirements can be reduced slightly (due to the small $A_{eff}$ of the IDF), and nonlinear performance remains relatively unchanged when compared to the span 100 shown in FIG. 2.

FIG. 7B shows a span 250, that has an asymmetrical design. In this alternative embodiment, segment I, which comprises fiber 213, has a length of about 30 to 40 km, segment II, which comprises fiber 223, has a length of about 25 km, and segment III, which comprises fiber 233, has a length of about 10 to 20 km. In the alternative embodiment shown in FIG. 7B, fiber 213 can be a SMF, fiber 223 can be an IDF, and fiber 233 can be a NZD fiber. The specific lengths of the SMF, NZD, and IDF fibers can be selected according to their dispersion properties so as to satisfy the aforementioned dispersion and dispersion slope conditions. While it can be preferred from a cabling perspective to use a symmetrical map, it is not required because the lengths, both absolute and relative, of the different segments may be altered to improve, for example, the noise figure of the span or to reduce power requirements.

According to an alternative aspect of the present invention, the NZD fiber preferably used in segment III of FIG. 2 may be substituted with SMF, or with whatever fiber is used in segment I. For example, another alternative transmission span 300 is shown in FIG. 8A. In this alternative embodiment, span 300 comprises a first segment 310 (segment I), a second segment 320 (segment II), and a third segment 330, which comprises fiber 313, which is the same fiber type as segment I. Line units 302 and 304, similar to line units 102 and 104 described above for FIG. 2, are also included. Here, fiber 313 can be a SMF and fiber 323 can be an IDF, and the first and third segments 310 and 330 are each 18.75 km and the second segment 320 is 37.5 km. As described previously with respect to FIG. 2, using a larger core fiber in segment III may provide an improved noise figure. A possible trade-off in this alternative design shown in FIG. 8A may include an increased Raman pump power due to shifting more of the amplification onto the fiber 323 comprising segment II.

FIG. 8C illustrates the performance improvement obtainable with a two-fiber, three-segment map by showing a plot of the relative noise figure (NF) of the span as a function of the length of the third segment. For these simulations, a total span length of 75 km is used. Segment II comprises an inverse dispersion fiber (1×IDF, with parameters corresponding to Segment II fiber types listed in Table II), and its length is held constant at 37.5 km. Segment I and segment III each comprise a standard SMF fiber type per the parameters indicated for segment I in Table II. The length of segment III can be varied according to the abscissa of FIG. 8C. As shown, the length of segment I is thus 37.5 km. In particular, FIG. 8C plots the noise figure reduction for the particular channel with the lowest signal-to-noise ratio (SNR). For each point, the channel powers have been adjusted so as to compare the noise figure improvement of conditions of equal SNR. As is apparent, the noise figure improves by >1.0 dB for L3>10 km, up to about 1.5 dB for L3=15 km, as compared to a two fiber, two-segment arrangement (L3=0).

In another alternative embodiment shown in FIG. 8B, a transmission span 350 includes a first segment 360 (segment I), a second segment 370 (segment II), and a third segment 380, which comprises the same fiber 313 as segment I. Here, fiber 313 can be a SMF and fiber 323 can be an IDF, and the first segment 360 is from about 22.5 km to about 32.5 km in length, the second segment 320 is about 37.5 km in length, and the third segment is from about 5 to about 15 km in length. Thus, in this alternative embodiment, the third segment 380 is somewhat shorter than the first segment 360 to further reduce the noise figure. Additionally a shorter third segment can be used to moderate the Raman pump power requirements. Further, a two-fiber, three segment map such as shown in FIG. 8A or 8B can have a flatter dispersion as a function of wavelength, as the inverse dispersion fibers can be designed to match the characteristics of SMF in both GVD and dispersion slope.

FIGS. 9A and 9B show another alternative embodiment of the present invention, transmission spans comprising two segments. In these alternative embodiments, segment III can be omitted from the design because the functionality and design considerations for fiber selection can be merged into those for segments I and II. For example, in FIG. 9A, a transmission span 400 includes a first segment 410 (segment I) and a second segment 420 (segment II). Here, fiber 413

(segment I) can be a SMF and fiber 423 (segment II) can be a 1×IDF. The first and second segments 410 and 420 can be equal in length, with each being about 37.5 km for the example 75 km span length. In this alternative embodiment, fiber 423 (segment II) is a primary Raman gain medium. In addition, fiber 423 (segment II) compensates for dispersion. System simulations indicate that such a map can have lower pump power requirements (by about 1 dB) as compared to the three-segment map shown in FIG. 2. Span 400 can have an increased noise figure as compared to the three-segment map shown in FIG. 2 as the amplification will be more localized to the end of the span. Span 400 has a more straightforward design and construction as compared to the three-segment map shown in FIG. 2. For example, a single cable type for the SMF+1×IDF map can be utilized. In addition, span 400 can result in minimal excursion of the net dispersion with wavelength.

According to another aspect of this alternative embodiment, a two-segment map of asymmetric construction, such as span 450 shown in FIG. 9B, can also be utilized. Here, the parameters of the span 450 are the same as span 400, except that the lengths of segments 460 (segment I) and 470 (segment II) are different, and segment II fiber 423 comprises a double inverse dispersion fiber (IDF×2: i.e., an inverse dispersion fiber with a compensation ratio of 2), such as the example IDF×2 fiber type shown previously in Table I.

According to yet another embodiment of the present invention, a fiber map design can provide the capability to further independently optimize both the dispersion and the dispersion slope of the span by introducing one or more additional fibers. For example, an "inverse non-zero" (INZ) fiber can be provided having a dispersion and dispersion slope opposite in sign and equal in magnitude to that for an NZD fiber used in Segment III.

In a first aspect of this alternative embodiment, FIG. 10A, shows a three-segment, double period map 500. Map 500 includes first span 505 and second span 507. In this example, each span is about 75 km in length. Span 505 includes a first segment 510 (segment I(a)), which comprises fiber 513, a second segment 520 (segment II(a)), which comprises fiber 523, and a third segment 530 (segment III(a)), which comprises fiber 533. Span 507 includes a fourth segment 540 (segment I(b)), which comprises fiber 543, a fifth segment 550 (segment II(b)), which comprises fiber 553, and a sixth segment 560 (segment III(b)), which comprises fiber 563. In this alternative embodiment, fibers 513 and 543 of segments 510 and 540, respectively, can be SMF, of the same or slightly different type, similar to the fiber types used for segment I of FIG. 2. Fibers 533 and 563 of segments 530 and 560, respectively, can be NZD fiber, of the same or slightly different type, similar to the fiber types used for segment III of FIG. 2. Line units 502, 503, and 504 are also provided, having capabilities similar to those described above for line units 102 and 104 of FIG. 2.

With respect to segments II(a) and II(b), i.e., the middle segments of spans 505 and 507, an IDF×2 (an inverse dispersion fiber with a compensation ratio of 2) can comprise fiber 523 and an INZ×2 fiber, i.e., a fiber having a dispersion and dispersion slope double in magnitude and opposite in sign to the non-zero dispersion-shifted fiber type used in segments III(a) and III(b), comprises fiber 553. The IDF fiber can have similar physical properties, such as effective mode field area, as the IDF fibers described previously. Thus, the dispersion of the SMF segments in both the first and second spans are compensated by segment II(a), while the NZD fiber in both spans is compensated by segment II(b). In the example shown in FIG. 10A, all segments are of nominally equal lengths, although segments of different lengths can be utilized in accordance with the asymmetric configurations described previously, as will be apparent to those of ordinary skill in the art given the present description. Further variations to this alternative embodiment can also be made, for example, by using IDF and INZ fibers with compensation ratios other than 2, with commensurate adjustments in the lengths of Segments II(a) and II(b) relative to Segments I and III. For practical purposes, it is preferable, however, for the compensation ratios of the INZ and IDF to be the same. This allows the link to be constructed using only two types of cable: one carrying the SMF and the NZD, and one carrying the IDF and INZ.

According to yet another aspect of this alternative embodiment of the present invention, a four (or greater) segment map can be utilized for a single span. As described previously, adding an additional fiber type of the appropriate properties can provide the capability to further independently optimize both the dispersion and the dispersion slope of the span.

As shown in FIG. 10B, a four-segment span 565 includes a first segment 570 (segment I), which comprises fiber 573, a second segment 580 (segment II(a)), which comprises fiber 583, a third segment 585 (segment II(b)), which comprises fiber 588, and a fourth segment 590 (segment III), which comprises fiber 593. In this alternative embodiment, fiber 573 of segment I can be a SMF, similar to the fiber types used for segment I of FIG. 2. Fiber 593 segments III can be a NZD fiber, similar to the fiber types used for segment III of FIG. 2. With respect to segments II(a) and II(b), i.e., the middle segments of span 565, an IDF (e.g., IDF×1) can comprise fiber 583 and an INZ fiber (e.g., INZ×1) can comprise fiber 588. Thus, the dispersion of the SMF segment is compensated by segment II(b), while the NZD fiber is compensated by segment II(a). Alternatively, fiber 583 can comprise an INZ fiber and fiber 588 can comprise an IDF. Line units 502, and 504 are also provided, having capabilities similar to those described above for line units 102 and 104 of FIG. 2.

All four segments can be of equal length (as shown) or differing lengths, as would be apparent to one of ordinary skill in the art given the present description. In addition, using the design of FIG. 10B, by minimizing the deviation of the dispersion across the signal band, this map design can have improved transmission properties, whereby the pump power can be expected to be reduced slightly as the small-core IDF is shifted toward the pump-end of the span. Note that this design can be constructed using the two classes of cables described above under the double-period map. Additional variations of this alternative design can include further reordering the fibers (e.g, SMF+NZD+IDF+INZ), utilizing additional fiber types and/or segments within the fiber span (e.g., adding a fifth segment for gain and/or dispersion compensation), and using IDF and INZ with compensation ratios other than unity (with commensurate alterations in the lengths of the segments).

FIG. 11 shows another embodiment of the present invention, a system 600 to communicate an optical (data) signal 611. System 600 includes a transmission link 605, which includes multiple repeating spans 601. Span 601 can be designed in accordance with one or more of the span embodiments discussed above (See FIGS. 2, and 7–10). For example, span 601 can include a first segment 610 providing low nonlinearity, a third segment 630 providing a primary gain medium for DRA, and a second segment 620 providing dispersion compensation. In this configuration, line unit 604 provides a Raman pump signal 632 counter-propagating to optical (data) signal 611. In addition, an auxiliary Raman pump signal 612 can be provided to be co-propagating with optical (data) signal 611.

System 600 further includes a transmitter unit 654, which comprises multiple conventional transmitters 655 (e.g., $T_1$–$T_N$), providing optical signals at individual wavelengths $\lambda_1$–$\lambda_N$, which are multiplexed at multiplexer (MUX) 650 to provide a WDM/DWDM (and the like) data signal. For example, transmitter unit 654 can provide 256 individual wavelength channels that are to be communicated along link 605. Further, the transmitter unit 654 can provide dispersion pre-compensation (not shown), for each channel individually or in aggregate, or some combination thereof. Modulators to provide the data rates are not shown for simplicity. In this arrangement, the modulated, multiplexed optical (data) signal 611 passes through the spans 601 comprising link 605. The optical (data) signal 611 is demultiplexed at DMUX 660, wherein the individual wavelengths $\lambda_1$–$\lambda_N$ are received at receiver unit 664, which can include a plurality of conventional receivers 665 (e.g., $R_1$–$R_N$). Further, the receiver unit 664 can provide dispersion post-compensation (not shown), for each channel individually or in aggregate, or some combination thereof. Thus, for purposes of FIG. 11, the system 600 can include the transmission link 605 and other endpoint equipment. For example, requisite endpoint equipment for transmitting an optical data signal can include conventional transmitters and receivers, and dispersion pre- and post-compensation fiber, and other conventional devices, as would be apparent to one of ordinary skill in the art given the present description.

In preferred embodiments of the present invention, dispersion maps for transmissions spans for long-haul and ultra-long haul applications with enhanced gain, improved dispersion, and acceptable noise figures can utilize remotely pumped erbium doped fiber amplification (rEDFA) schemes in combination with the distributed Raman amplification schemes described above to provide primary or auxiliary gain. By "remote" pumping, it is meant that the segment of erbium doped fiber can be inserted into the transmission span some distance removed from either the transmit or receive terminals that inject the pump signal. The segment of erbium doped fiber can be pumped by injecting a high-power laser (e.g., at about 1480 nm) into the transmission span from the terminals. By implementing both transmitter and receiver amplifiers (i.e., remotely pumped post-amplification and pre-amplification, respectively), the repeaterless transmission link length can be increased to about >150 km.

Remote EDFA can provide efficient use of a residual Raman pump. For example, EDFAs pumped at ~1480 nm can be made highly efficient, with >10 dB/mW gain efficiency (small signal) and >80% pump to signal conversion (in saturation). In comparison, with exclusive DRA, much of the power initially in the short-wavelength pumps is transferred to the long-wavelength pumps via the Raman gain. When the power in these short-wavelength pumps has dropped to approximately <20 mW, they provide little additional Raman gain to the signals. By inserting a section of Er doped fiber within the span, e.g., at or near the 80% power reduction location, this power can be efficiently converted to a significant lumped gain.

FIGS. 12–18 show alternative examples of this embodiment.

Figure 12:
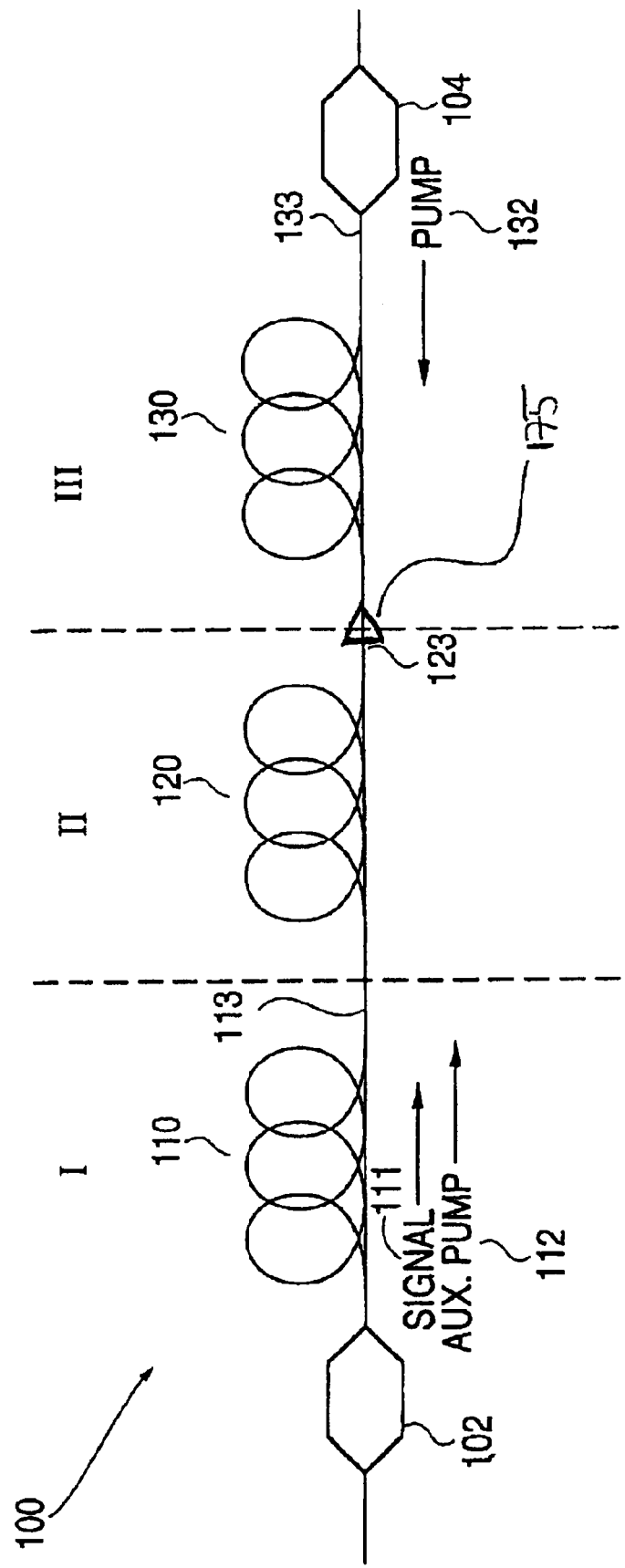
FIG. 12 shows a three-segment dispersion map for a long-haul transmission system having a remote erbium doped amplification (rEDFA) scheme according to an alternative embodiment of the present invention.

For example, FIG. 12 shows a transmission span, similar to that shown in FIG. 2, that additionally includes an optical fiber (shown as a fiber amplifier 175) doped with a non-zero concentration of $Er^{3+}$, disposed at a location in the span for remote pumping. The concentration of erbium can be from about 100 ppmbw to about 1000 ppmbw. The length of the erbium fiber 175 can be from about 10 m to about 100 m, depending on the erbium concentration. In addition, the mode field area $A_{eff}$ for fiber 175 can be from about 15 $\mu m^2$ to about 40 $\mu m^2$, preferably about 20 $\mu m^2$ to about 25 $\mu m^2$, which provides sufficient gain, even with any resulting loss of pump signal. For example, a Lucent HG 1480 fiber can be utilized for the erbium fiber 175.

Figure 13:
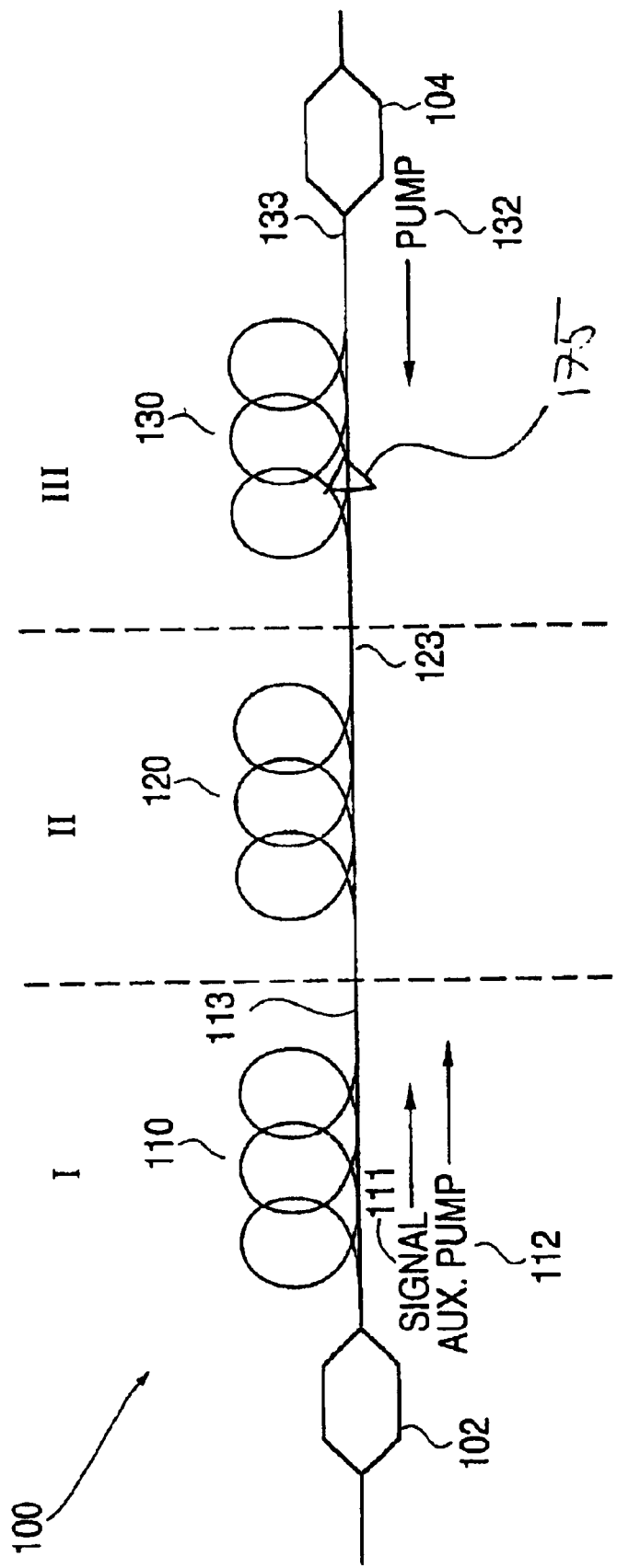
FIG. 13 shows a three-segment dispersion map for a long-haul transmission system having a remote erbium doped amplification (rEDFA) scheme according to a further alternative aspect.
Figure 14:
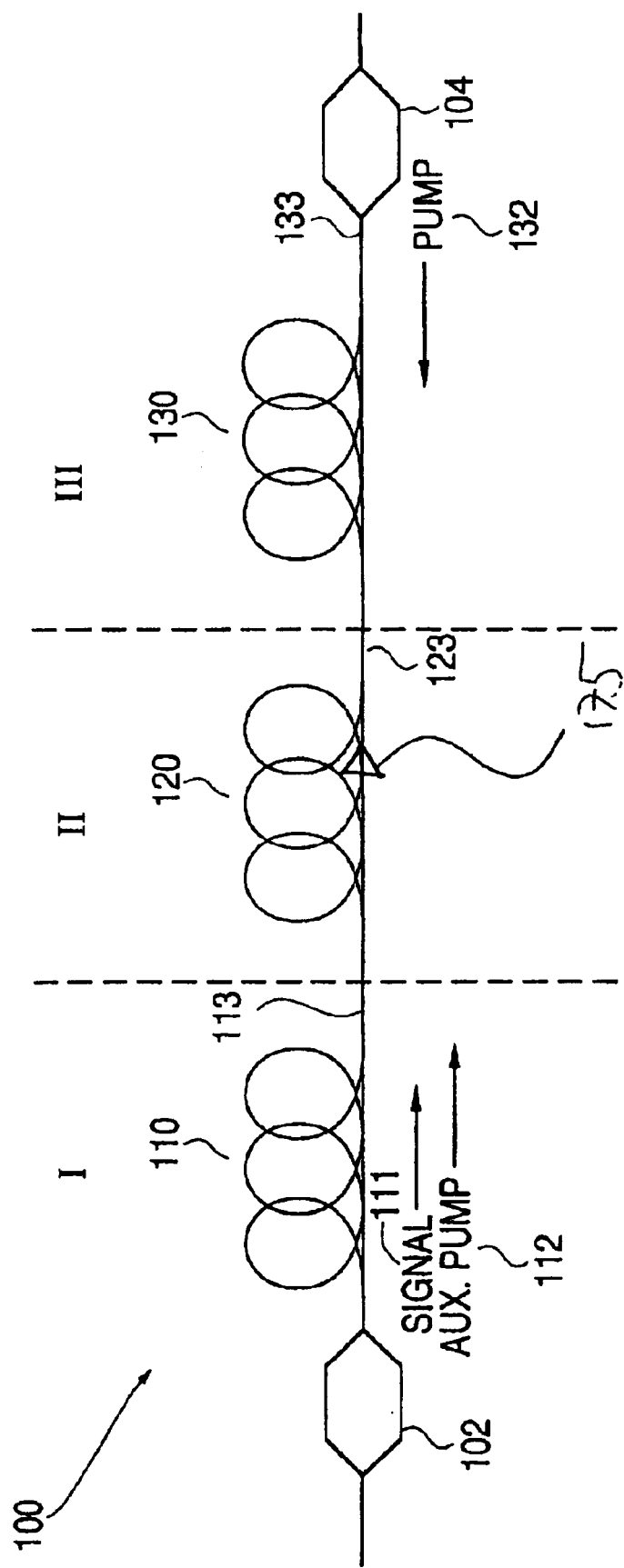
FIG. 14 shows a three-segment dispersion map for a long-haul transmission system having a remote erbium doped amplification (rEDFA) scheme according to a further alternative aspect.

In this example, the $Er^{3+}$ doped fiber 175 is located at an interface between Segment II and III (e.g., about 15 km to 25 km from line unit 104), which corresponds to a pre-amplification scheme. FIG. 13, which shows erbium doped fiber amplifier 175 disposed within segment III and FIG. 14, which shows erbium doped fiber amplifier 175 disposed within Segment II, are alternative examples of pre-amplification configurations. By "pre-amplification" it is meant that the backward pump signal (from line unit 104) provides remote pumping of the erbium doped fiber amplifier 175. This design provides a span that can utilize distributed Raman amplification as the primary gain mechanism, with auxiliary gain from the rEDFA pumped using the residual power from the backward Raman pumping.

In this embodiment, the $Er^{3+}$ doped fiber 175 provides discrete amplification of the optical signal by remote pumping. Utilizing a pump scheme similar to that shown in Table III, but with potential modifications described herein, the erbium doped fiber amplifier 175 can be remotely pumped by the residual power in the 1460–1510 nm pump wavelengths. The gain from the rEDFA is in addition to the Raman (or erbium or erbium and Raman) gain in the Segment III fiber. Although the rEDFA location and the span fiber parameters may be adjusted to vary the relative contributions of the EDFA and Raman gains, there will be some significant Raman contribution so long as the distance between the line units and the rEDFA is greater than a few kilometers. For example, a preferred location for insertion of an rEDFA is at least 2 km from the line source.

For example, with respect to the configuration shown in FIG. 12, at the Segment II/Segment III interface, the pump power distribution will be affected by Raman gain so that the intensity of pump signal on the long wavelength side will be increased relative to the intensity of the pump signal on the shorter wavelength side. In addition, a pre-amplification configuration such as shown in FIG. 12 may be preferred for practical considerations, as the placement of fiber 175 at the Segment II/Segment III interface can minimize splicing losses. In addition, it can also be preferable to have the length of the Segment III fiber shorter, e.g., about 15 km.

Figure 15:
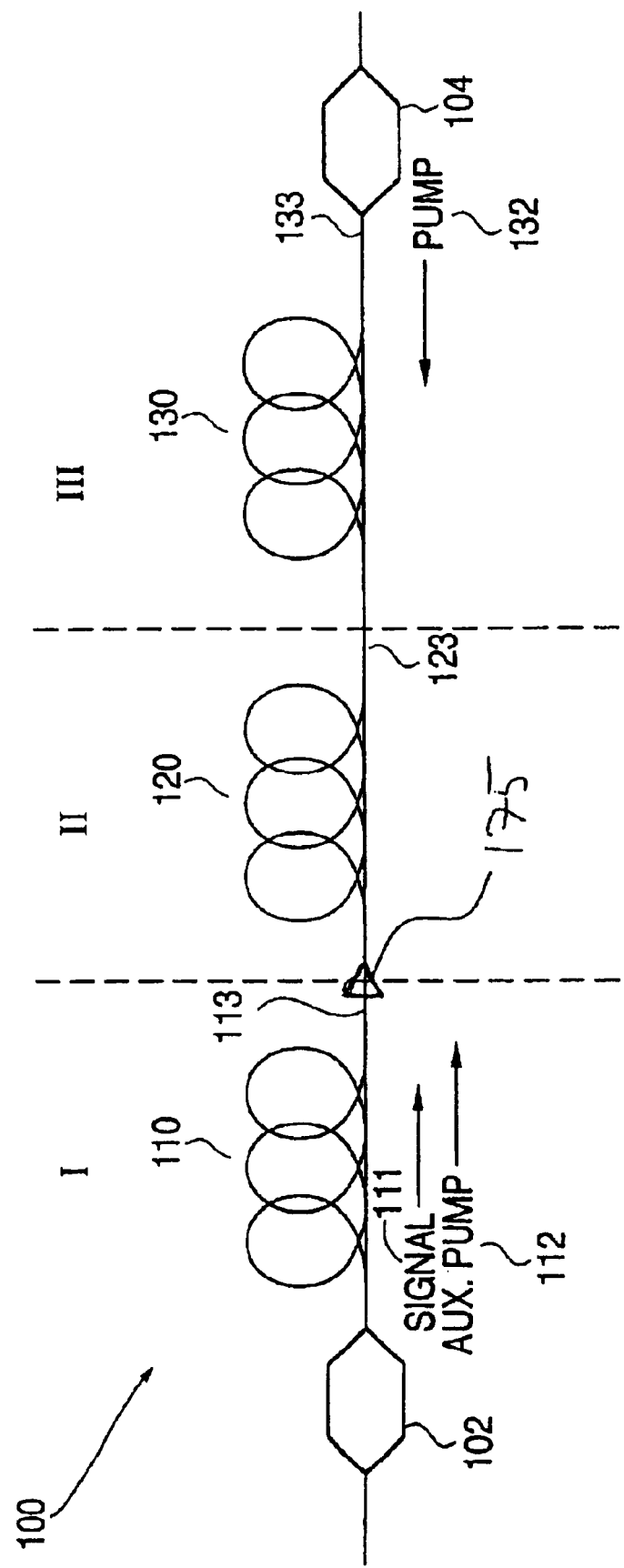
FIG. 15 shows a three-segment dispersion map for a long-haul transmission system having a remote erbium doped amplification (rEDFA) scheme according to a further alternative aspect.
Figure 16:
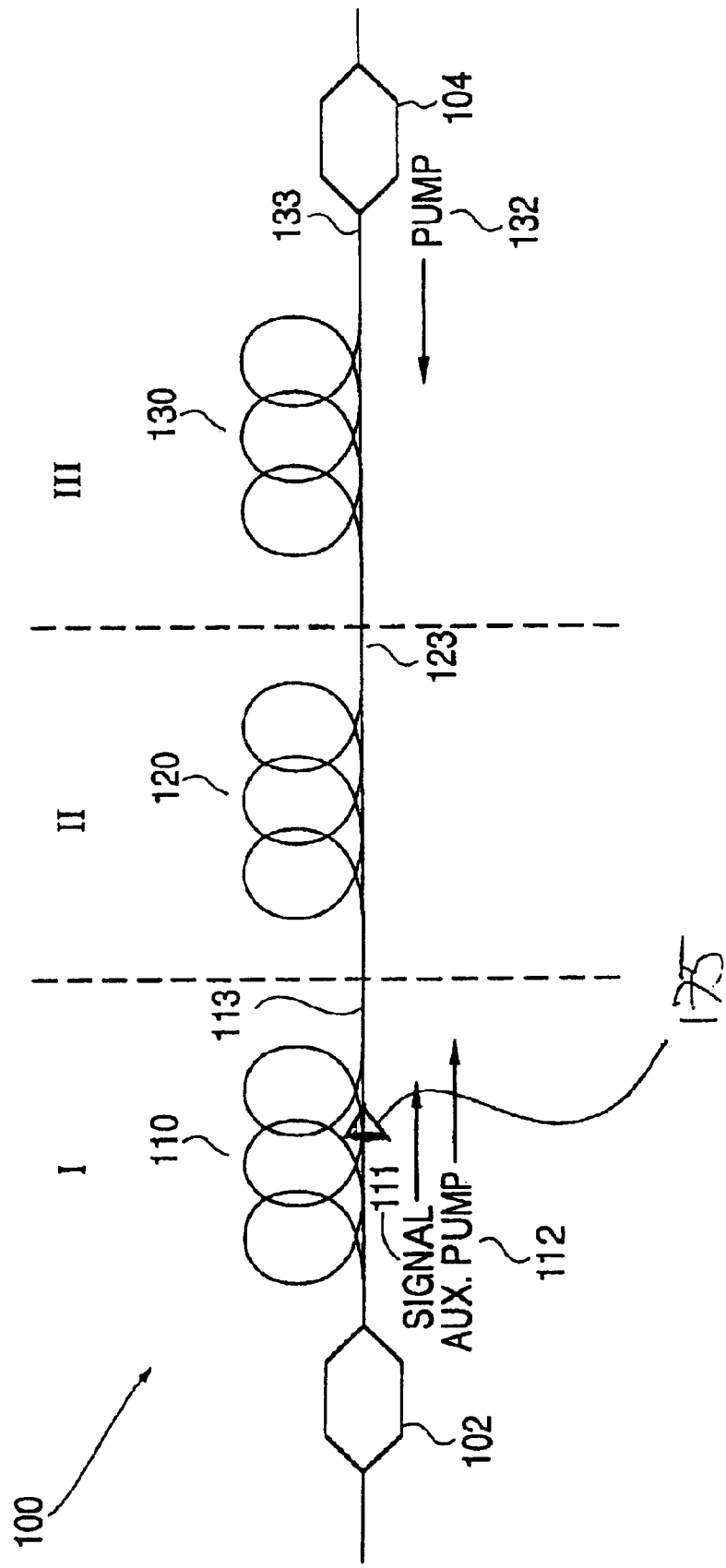
FIG. 16 shows a three-segment dispersion map for a long-haul transmission system having a remote erbium doped amplification (rEDFA) scheme according to a further alternative aspect.
Figure 19:
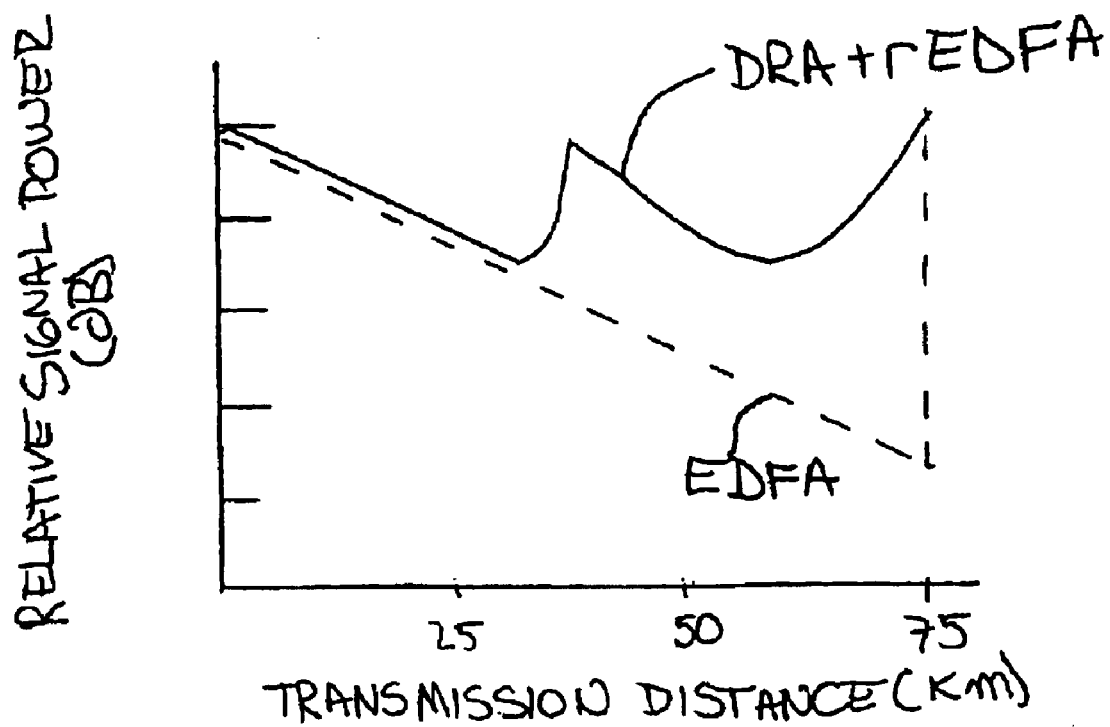
FIG. 19 shows a comparison between data channel power evolution for a DRA+rEDFA span and an EDFA-based span, where the rEDFA fiber is placed at an example location about mid span.

An alternative configuration is to position the discrete EDFA as a post-amplifier, that is, to place it closer to the beginning of the span so that it will be forward-pumped. For example, FIG. 15 shows erbium doped fiber amplifier 175 disposed at the interface of Segment I and Segment II and FIG. 16 shows erbium doped fiber amplifier 175 disposed within Segment I, as alternative examples of post-amplification configurations. A post-amplification scheme can be utilized to limit SNR degradation. For example, referring back to FIG. 1, for a particular fiber and distance of 75 km, DRA reaches a relative signal power minimum at about 60 km. If a remotely pumped EDFA is placed within the span, the resulting relative signal power does not experience as great a reduction in signal power. See e.g., FIG. 19, which shows a comparison between data channel power evolution for a DRA+rEDFA span and an erbium doped fiber amplifier-based span, where the rEDFA fiber is place at an example location about mid-span. In addition, the location of the rEDFA can also optimized based on the non-linear effects resulting from the rEDFA being located too close to the line unit.

Figure 17:
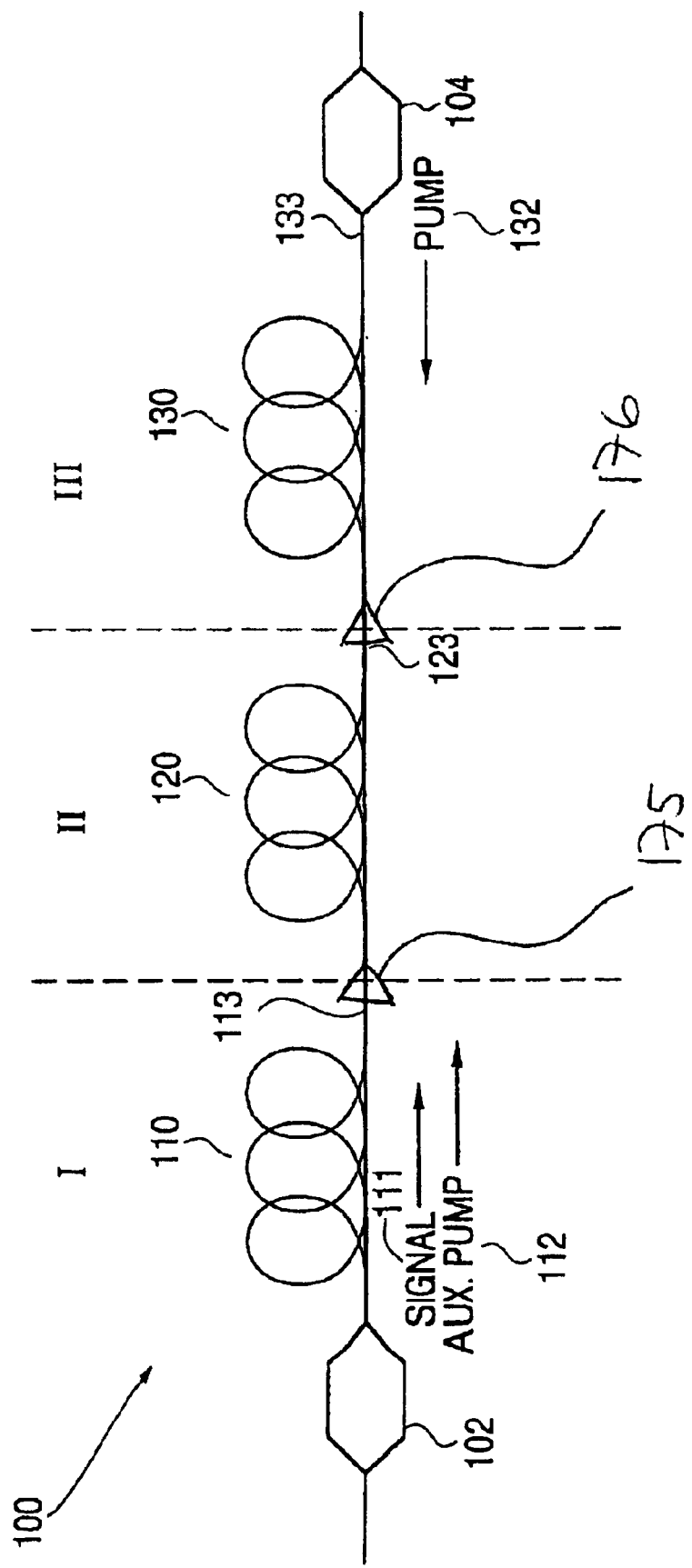
FIG. 17 shows a three-segment dispersion map for a long-haul transmission system having a remote erbium doped amplification (rEDFA) scheme according to a further alternative aspect.

Additionally, both pre- and post-amplifier configurations may be implemented in the same span as illustrated in FIG. 17, where erbium doped fiber amplifier 175 is disposed at the Segment I/Segment II interface (post-amplification) and erbium doped fiber amplifier 176 is disposed at the Segment II/Segment III interface (pre-amplification). Alternative configurations of combination pre- and post-amplification schemes where the erbium doped fiber amplifiers are placed within segments or at segment interfaces can also be utilized, as would be apparent to one of ordinary skill in the art given the present description. These rEDFA schemes can improve the span noise figure for the short-wavelength channels, which can be used to extend the overall length of the span or of the entire link.

With rEDFA, the overall gain, noise, and dispersion conditions can be compensated in accordance with the parameters described above for the DRA-based maps. For example, for a span 100 shown in FIG. 12, a dispersion condition ($D_c$) for the span can be expressed by:

$$D_c = \frac{1}{L}|D_1 L_1 + D_2 L_2 + D_3 L_3 + D_{Er} L_{Er}| \approx \Delta,$$

where $D_1$ is a first dispersion coefficient for the first segment, $L_1$ is the first fiber length, $D_2$ is a second dispersion coefficient for the second segment, $L_2$ is the second fiber length; $D_3$ is a third dispersion coefficient for the second segment, $L_3$ is the third fiber length $D_{Er}$ is a dispersion coefficient for the Er-doped fiber segment, $L_{Er}$ is the Er-doped fiber segment length; and L is the total span length. A dispersion slope condition ($D'_c$) for the span, which is optimally kept as small as possible, can be expressed by:

$$D'_c = \frac{1}{L}|D'_1 L_1 + D'_2 L_2 + D'_3 L_3 + D'_{Er} L_{Er}| \cdot \frac{\delta\lambda}{2} << \Delta,$$

where $D'_1$ is a first dispersion slope for the first segment, $D'_2$ is a second dispersion slope for the second segment, $D'_3$ is a third dispersion slope for the third segment, $D'_{Er}$ is the dispersion slope for the Er-doped fiber segment, $\delta\lambda$ is a total wavelength bandwidth communicated by the span (e.g., 1620 nm–1520 nm=100 nm=$\delta\lambda$), and $0 \leq \Delta \leq 1.0$ ps/nm/km, where $\Delta$ is preferably non-zero. Thus, for a transmission link on the order of about 10,000 km, the total link dispersion $\Delta_L$ can be $0 \leq \Delta_L \leq 5000$ ps/nm/km, where, preferably, $\Delta_L$ can be $1000 \leq \Delta_L \leq 3000$ ps/nm/km. For the dispersion slope condition, "<<" corresponds to a quantity that is about a factor of 3 or more less than $\Delta$.

With respect to noise figure, rEDFA can provide an acceptable noise figure for the short-wavelength signal channels. For example, utilizing the residual power in the long-wavelength pumps to remotely pump an EDFA can provide for selectively amplifying the C-band channels. As discussed previously with respect to DRA, these C-band channels can have low noise figures due to the depletion of the short-wavelength pumps by the long-wavelength pumps, where the gain for the short-wavelength signals is confined to within a few kilometers of the line unit. Also, the C-band channels can have low noise figures due to a significant portion of the Raman gain for the short-wavelength channels being provided by the long-wavelength pumps, where the noise figure for Raman amplification is not as acceptable at small frequency shifts (e.g., <200 cm$^{-1}$) from the pump. By locating the remotely pumped EDFA at a sufficient distance from the line unit, the C-band channels can be boosted to reduce the maximum loss excursion by about 3–5 dB, and the length of fiber over which these channels can be Raman pumped by the long-wavelength signals may be reduced. Here, the noise figure for the long-wavelength signal channels can be increased, as the Raman gain for these channels will be confined to the fiber between the line unit and the remote EDFA, as opposed to exclusive DRA, where the gain for the C-band channels can be distributed throughout Segment III and even significantly into Segment II.

In a further alternative embodiment, a two segment map analogous to that described above can be utilized with rEDFA. For example, FIGS. 18A and 18B illustrate alternative two-segment dispersion maps with rEDFA, where pre- and/or post-amplification configurations can be utilized. Consistent with the three segment maps, there will be some significant Raman contribution so long as the distance between the line units and the rEDFA is greater than a few kilometers. For the two segment maps in particular, the distance to the rEDFA can be chosen to optimize the overall system performance, taking into account the attenuation and Raman gain of the Segment II fiber. The net span dispersion can be selected to be small to optimize overall system performance. Thus, the Segment II fiber can be selected to have a dispersion and dispersion slope to approximately cancel the dispersion and slope of the full length of Segment I. In addition, an rEDFA scheme can also be incorporated in a four, five, or six segment map, in accordance with the parameters discussed herein.

In a system implementation for rEDFA, line units, such as line unit 104, can be utilized with an overall reduction of pump power requirements. As described above, C-band channels are to receive some gain from the remotely pumped EDFA. Accordingly, the Raman gain contribution for these channels need not be so large as in the exclusive DRA scheme. Thus, the power requirements in the 1400–1440 nm pump signals can be relaxed, while the power requirements for the 1450–1510 nm pumps can be increased. In conventional pump sources in these wavelength regions, there is reduced overhead at the short pump wavelengths, while there is more overhead for the long pump wavelengths.

In a further alternative embodiment, a transmission span can include a combination of dEDFA and rEDFA. For example, the Segment III fiber of FIG. 12 can be doped with a non-zero concentration of Er$^{3+}$. Other configurations of a transmission span that includes a combination of dEDFA and rEDFA will be apparent to those of ordinary skill in the art given the present description.

Accordingly, the present invention describes a new fiber transmission span design that can be incorporated in a system for long-haul (e.g., 3000–15,000 km) transmission of optical data at high aggregate data rates (e.g., >2 Tb/s per fiber) using distributed amplification. The complete transmission link can include two, three, or more types of optical fiber concatenated periodically. The principal design objectives of the system are to provide parameters from which a designer can select appropriate types, lengths, and arrangements of fibers so as to optimize system performance under impairments of fiber attenuation, group delay dispersion, dispersion slope, optical nonlinearity, and distributed Raman amplification noise. The segment arrangement and lengths of constituent fibers can be used to reduce the noise factor of the span. Further, lower nonlinearity can be provided (and dispersion compensated within the segmented approach) in order to reduce the launch signal power, which can lead to reduced wavelength spacing requirements for large multiple channel applications.

In particular, applications of the present invention can include trans-oceanic and trans-continental ultra-long-haul (e.g., > about 1000 km) data transmission systems. The present invention also has an application in shorter distance terrestrial and submarine optical data transmission systems, including long-haul (e.g., up to approximately 1000 km) terrestrial links and feeder links for submarine systems. An additional application of the present invention is in expanding the data rate within long-haul WDM systems by enabling closer channel spacings, as the improved span noise figure allows lower signal powers, thus reducing nonlinear impairments and channel-to-channel crosstalk.

While the invention has been described in detail and with reference to specific embodiments thereof, it will be apparent to one skilled in the art that various changes and modifications can be made therein without departing from the scope of the invention. Thus, the breadth and scope of the present invention should not be limited by any of the above-described exemplary embodiments.

What is claimed is:

1. A transmission span for a telecommunications link, comprising:
    a first segment comprising a first optical fiber having a first fiber length and a first physical property;
    a second segment comprising a second optical fiber having a second fiber length and a second physical property;
    a third segment comprising a third optical fiber having a third fiber length and a third physical property, the first and third segments optically coupled to opposing ends of the second segment, and wherein at least one of the first and third physical properties is different from the second physical property, wherein the first segment provides low nonlinearity, the third segment provides distributed gain, and the second segment compensates for the dispersion of the first and third segments; and
    a fourth optical fiber doped with a non-zero concentration of $Er^{3+}$, wherein the fourth optical fiber is disposed at a location in the span for remote pumping, the location selected from the group consisting of within the first segment, within the second segment, within the third segment, at an interface between the first and second segments, and at an interface between the second and the third segments, wherein the fourth optical fiber provides discrete amplification of the optical signal.

2. The transmission span according to claim 1, wherein the first optical fiber is a fiber selected from the group consisting of SMF type fibers, SCF type fibers, and NDSF type fibers, having an effective mode field area of from about 70 $\mu m^2$ to about 120 $\mu m^2$, the second optical fiber is an inverse dispersion fiber having an effective mode field area of about 15 $\mu m^2$ to about 40 $\mu m^2$, and the third optical fiber is a non-zero dispersion shifted fiber having an effective mode field area of from about 45 $\mu m^2$ to about 70 $\mu m^2$.

3. The transmission span according to claim 1, wherein the $Er^{3+}$ dopant concentration is from about 100 parts per million (ppm) by weight to about 1000 ppm by weight and wherein a length of the fourth optical fiber is from about 10 m to about 100 m.

4. The transmission span according to claim 3, wherein the $Er^{3+}$ dopant concentration is from about 200 parts per million (ppm) by weight to about 500 ppm by weight.

5. The transmission span according to claim 1, wherein the fourth optical fiber is disposed at the interface between the second and the third segments.

6. The transmission span according to claim 1, wherein the fourth optical fiber is disposed at the interface between the first and second segments.

7. The transmission span according to claim 1, wherein the fourth optical fiber is disposed within the first segment.

8. The transmission span according to claim 1, wherein the fourth optical fiber is disposed within the second segment.

9. The transmission span according to claim 1, wherein the fourth optical fiber is disposed within the third segment.

10. The transmission span according to claim 1, wherein the fourth optical fiber is disposed at a location in the span that reduces a signal to noise degradation.

11. The transmission span according to claim 1, wherein the length of the third fiber segment is shorter than the length of the second fiber segment and is shorter than the length of the first fiber segment.

12. A method of providing a transmission span that compensates for signal attenuation, dispersion, and nonlinearity of an optical signal communicated between two line units and provides distributed amplification, comprising:
    dividing the transmission span into a plurality of fiber segments;
    selecting a different fiber for each of the segments so that a first segment provides low nonlinearity, a third segment provides distributed gain, and a second segment compensates for the dispersion of the first and third segments, the dispersion being based on a dispersion condition and a dispersion slope condition for the span; and
    inserting an $Er^{3+}$ doped optical fiber into the transmission span at a location selected from the group consisting of within the first segment, within the second segment, within the third segment, at an interface between the first and second segments, and at an interface between the second and the third segments, wherein the $Er^{3+}$ doped optical fiber provides discrete amplification of the optical signal.

13. The method according to claim 12, wherein the $Er^{3+}$ doped optical fiber is inserted at a location at least 2 kilometers in distance from both of the line units.

14. A telecommunications system for communicating an optical signal, comprising:
    a first transmission span; wherein the first transmission span includes
        a first segment comprising a first optical fiber having a first fiber length and a first physical property,
        a second segment comprising a second optical fiber having a second fiber length and a second physical property,
        a third segment comprising a third optical fiber having a third fiber length and a third physical property, the first and third segments optically coupled to opposing ends of the second segment, and wherein at least one of the second and third physical properties is different from the first physical property, wherein the first segment provides low nonlinearity, the third segment provides primary distributed gain, and the second segment compensates for the dispersion of the first and second segments, and
        a fourth optical fiber doped with a non-zero concentration of $Er^{3+}$, wherein the fourth optical fiber is disposed at a location in the span for remote pumping, the location selected from the group consisting of within the first segment, within the second segment, within the third segment, at an interface between the first and second segments, and at an interface between the second and the third segments, wherein the fourth optical fiber provides discrete amplification of the optical signal;

a first line unit disposed at a first end of the first transmission span; and a second line unit disposed at a second end of the first transmission span, wherein the optical signal propagates from the first line unit to the second line unit along the first span in a first direction, and wherein the second line unit provides a plurality of pump beams into the first span in a second direction opposite to the first direction to provide remote pumping for discrete Erbium amplification and distributed Raman amplification of the optical signal.

15. The telecommunications system of claim 14, wherein the pump beams generated by the second line unit include a first set of pump beams and a second set of pump beams, and wherein the first set of pump beams have a shorter wavelength and a lower intensity than the second set of pump beams.

16. The telecommunications system of claim 14, wherein the first optical fiber is a fiber selected from the group consisting of SMF type fibers, SCF type fibers, and NDSF type fibers, having an effective mode field area of from about 70 $\mu m^2$ to about 120 $\mu m^2$, the second optical fiber is an inverse dispersion fiber having an effective mode field area of about 15 $\mu m^2$ to about 40 $\mu m^2$, and the third optical fiber is a non-zero dispersion shifted fiber having an effective mode field area of from about 45 $\mu m^2$ to about 70 $\mu m^2$, and wherein the fourth optical fiber is doped with an $Er^{3+}$ dopant concentration from about 100 parts per million (ppm) by weight to about 1000 ppm by weight.

17. The telecommunications system of claim 16, wherein a length of the fourth optical fiber is from about 10 m to about 100 m.

18. The telecommunications system of claim 14, wherein the location of the fourth optical fiber is at least 2 kilometers in distance from the line units.

19. The telecommunications system of claim 14, wherein the location is selected to provide remote pre-amplification of the optical signal.

20. The telecommunications system of claim 14, wherein the location is selected to provide remote post-amplification of the optical signal.

21. A transmission span for a telecommunications link, comprising:

a first segment comprising a first optical fiber having a first fiber length and a first physical property;

a second segment comprising a second optical fiber having a second fiber length and a second physical property different from the first physical property, the first segment optically coupled to the second segment, wherein the first optical fiber mitigates nonlinearity and the second optical fiber provides dispersion compensation for the first fiber and a distributed gain medium, wherein the first optical fiber is selected from the group consisting of SMF type fibers, SCF type fibers, and NDSF type fibers having an effective mode field area of from about 70 $\mu m^2$ to about 120 $\mu m^2$ and the second optical fiber is an inverse dispersion type fiber having an effective mode field area of about 15 $\mu m^2$ to about 40 $\mu m^2$; and a third optical fiber doped with a non-zero concentration of $Er^{3+}$, wherein the third optical fiber is disposed at a location in the span for remote pumping, the location selected from the group consisting of within the first segment, within the second segment, and at an interface between the first and second segments, wherein the third optical fiber provides discrete amplification of the optical signal.

22. The transmission span according to claim 21, wherein the $Er^{3+}$ dopant concentration is from about 100 parts per million (ppm) by weight to about 1000 ppm by weight and wherein a length of the fourth optical fiber is from about 10 m to about 100 m.

23. The transmission span according to claim 21, wherein the length of the second fiber segment is shorter than the length of the first fiber segment.

* * * * *